(12) United States Patent
Peleg et al.

(10) Patent No.: US 7,852,370 B2
(45) Date of Patent: Dec. 14, 2010

(54) METHOD AND SYSTEM FOR SPATIO-TEMPORAL VIDEO WARPING

(75) Inventors: Shmuel Peleg, Mevaseret Zion (IL);
Alexander Rav-Acha, Jerusalem (IL);
Daniel Lischinski, Jerusalem (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 1430 days.

(21) Appl. No.: 10/556,601

(22) PCT Filed: Nov. 2, 2005

(86) PCT No.: PCT/IL2005/001150
§ 371 (c)(1),
(2), (4) Date: Nov. 14, 2005

(87) PCT Pub. No.: WO2006/048875
PCT Pub. Date: May 11, 2006

(65) Prior Publication Data
US 2006/0262184 A1    Nov. 23, 2006

Related U.S. Application Data

(60) Provisional application No. 60/624,896, filed on Nov. 5, 2004, provisional application No. 60/644,371, filed on Jan. 18, 2005, provisional application No. 60/692,595, filed on Jun. 22, 2005.

(51) Int. Cl.
*H04N 7/00* (2006.01)
(52) U.S. Cl. ................ 348/36; 348/218.1; 348/220.1
(58) Field of Classification Search .......... 348/36, 348/218.1–220.1
See application file for complete search history.

(56) References Cited

U.S. PATENT DOCUMENTS

| | | | | |
|---|---|---|---|---|
| 5,262,856 A | * | 11/1993 | Lippman et al. | ........ 375/240.12 |
| 6,020,931 A | * | 2/2000 | Bilbrey et al. | ............... 348/584 |
| 6,075,905 A | | 6/2000 | Herman et al. | |
| 6,393,163 B1 | | 5/2002 | Burt et al. | |
| 6,492,990 B1 | | 12/2002 | Peleg et al. | |
| 6,532,036 B1 | | 3/2003 | Peleg et al. | |
| 6,665,003 B1 | | 12/2003 | Peleg et al. | |
| 2004/0143189 A1 | * | 7/2004 | Lysyansky et al. | .......... 600/450 |
| 2004/0223051 A1 | | 11/2004 | Peleg et al. | |

OTHER PUBLICATIONS

Grooves, J., "Video Sculpture: Spatio-Temporal Warping", Msc Thesis Dissertation, 44 pages, Dec. 2003.
Klein, A.W., et al., "Video Cubism" Tech Rep. MSR-TR-2001-45, Microsoft Research, Apr. 2001.

(Continued)

*Primary Examiner*—Benny Q Tieu
*Assistant Examiner*—Marcellus Augustin
(74) *Attorney, Agent, or Firm*—Browdy and Neimark, PLLC

(57) ABSTRACT

A computer-implemented method and system for transforming a first sequence of video frames of a first dynamic scene captured at regular time intervals to a second sequence of video frames depicting a second dynamic scene wherein for at least two successive frames of the second sequence, there are selected from at least three different frames of the first sequence portions that are spatially contiguous in the first dynamic scene and copied to a corresponding frame of the second sequence so as to maintain their spatial continuity in the first sequence. In a second aspect, for at least one feature in the first dynamic scene respective portions of the first sequence of video frames are sampled at a different rate than surrounding portions of the first sequence of video frames; and the sampled portions are copied to a corresponding frame of the second sequence.

27 Claims, 16 Drawing Sheets

OTHER PUBLICATIONS

Kwatra, V., et al., :Graphcut Textures: Image and Video Synthesis Using Graph Cuts ACM Transaction on Graphics, (Jul. 3, 2003), vol. 22, No. 3, pp. 227-286.

Shi, J. et al., "Motion Segmentation and Tracking Using Normalized Cuts", ICCV978, (Jan. 1998), pp. 1154-1160.

Bennett, E.P., et al., "Proscenium: A Framework for Spatio-Temporal Video Editing", Proceedings of the Eleventh ACM International Conference on Multimedia, pp. 177-184, Nov. 2, 2003. XP002379401.

Kwatra V., et al., "Graphcut Textures: Image and Video Synthesis Using Graph Cuts", ACM Transactions on Graphics, vol. 22, No. 3, pp. 277-286, Jul. 2003. XP002379286.

Rav-Acha, A., et al., "Mosaicing with Parallax Using Time Warping", IEEE Computer Society Conference on Computer Vision and Pattern Recognition Workshops, (CVPRW'04), Jun. 27, 2004 (whole document). XP002379287.

Fels, S. et al., "Techniques for Interactive Video Cubism", Proceedings ACM Multimedia, pp. 368-370, Oct. 30, 2000. XP001173137.

U.S. Appl. No. 60/624,896, Peleg et al.

Adelson, E.H. et al., "The Plenoptic Function and the Elements of Early Vision" Computational Models of Visual Processing, (1991), pp. 3-20.

Agarwala, A. et al., "Interactive Digital Photomontage", ACM SIGGRAPH '04 conference proceedings, (2004), pp. 1-9.

Baker, H.H. et al., "Generalizing Epipolar-Plane Image Analysis on the Spatiotemporal Surface, "Int'l Journal of Computer Vision, (1989), vol. 3, pp. 33-49.

Baker P. et al., "A Spherical Eye from Multiple Cameras (Makes Better Models of the World)", Proceedings of the 2001 IEEE CVPR '01, (2001), pp.

Beier, T. et al., "Feature-Based Image Metamorphosis", Computer Graphics, (1992), vol. 26, No. 2, pp. 35-42.

Bhat, K.S. et al., "Flow-based Video Synthesis and Editing", ACM, (2004), pp. 360-363.

Bergen, J.R., et al., "Hierarchical Model-Based Motion Estimation", David Sarnoff Research Center, (1992), pp. 237-252.

Bolles, R.C., et al., "Epipolar-Plane Image Analysis" An Approach to Determining Structure from Motion, Int'l Journal of Computer Vision, (1987), vol. 1, pp. 7-55.

Carpendale, S., et al., "Achieving Higher Magnification in Context", ACM, (2004), vol. 6, No. 2, pp. 71-80.

Cohen, M.F., et al., Image Stacks, Microsoft Research Technical Support, (2003), 4 pages.

Fitzgibbon, A.W., "Stochastic rigidity: Image registration for nowhere-static scenes", IEEE, (2001), pp. 1-8.

Irani, M. et al., "Efficient Representative of Video Sequences and Their Applications", David Sarnoff Research Center, pp. 1-39.

Klein A.W., et al., "Stylized Video Cubes, "Proc. Symp Comp Animation, (2002), 9 pages.

Levoy, M. et al., "Light Field Rendering", Proc. ACM SIGGRAPH, (1996), pp. 1-12.

Nayar, S.K., "Catadioptric Omnidirectional Camera", IEEE Comp Society Conf on Comp. Vision and Pattern Recognition, (1997), pp. 482-488.

Peleg, S., et al., "Mosaicing on Adaptive Manifolds", IEEE Transactions on Pattern Analysis and Machine Intelligence, (Oct. 2000), vol. 22, No. 10 pp. 1144-1154.

Rademacher, P. et al., "Multipe-Center-of-Projection Images" ACM SIGGRAPH, (1998), pp. 199-206.

Rav-Acha, A. et al., "Online Registration of Dynamic Scenes using Video Extrapolation", IEEE Workshop on Dynamical Vision at ICCV'05, (Oct. 2005), 6 pages.

Schodl, A., et al., "Video Textures", ACM Transactions on Graphics SIGGRAPH, (2000), pp. 489-498.

Torr, P.H.S. et al., "MLESAC: A new robust estimator with application to estimating image geometry", CVIU '00, (2000), vol. 1, pp. 138-156.

Yu Zheng, J. et al., "Generating Dynamic Projection Images for Scene Representation and Understanding", Computer Vision and Image Understanding, (Dec. 1998), vol. 72, No. 3, pp. 237-256.

Zomet, A. et al., "Mosaicing New Views: The Crossed-Slits Projection" IEEE Transactions on Pattern Analysis and Machine Intelligence, (Jun. 2003), vol. 25, No. 6, pp. 741-754.

* cited by examiner

FIG. 4a
FIG. 4b
FIG. 4c
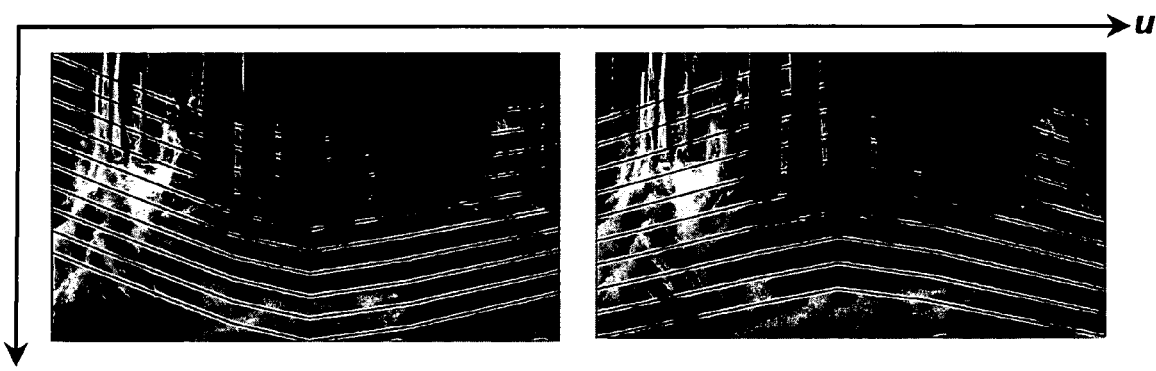
FIG. 4d
FIG. 4e FIG. 6a                    FIG. 6b ↑ ↑
*Disappearance Appearance*
*strip strip*

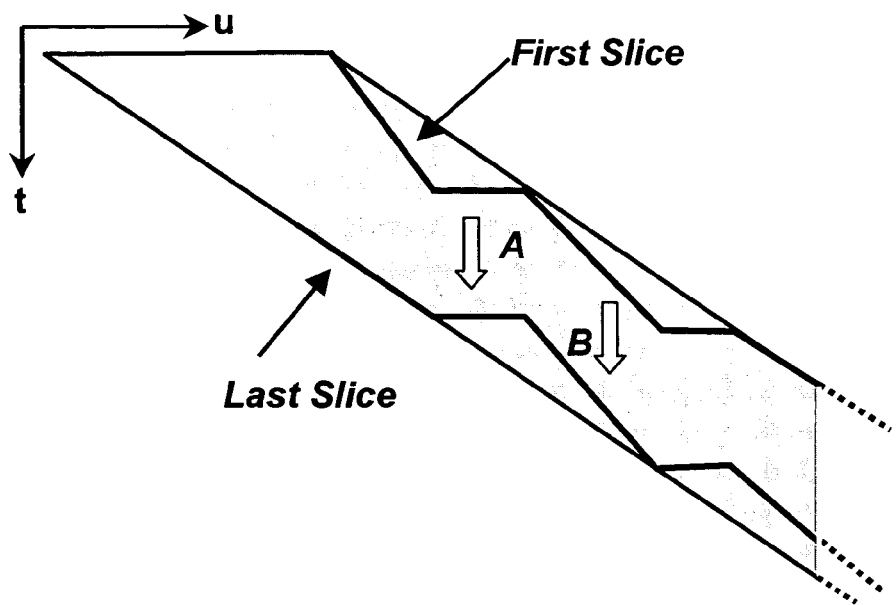
FIG. 11
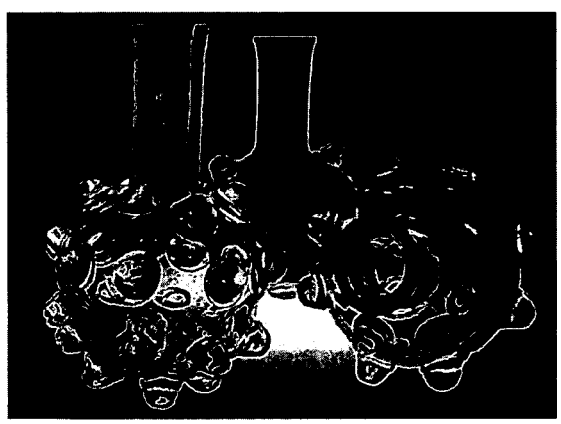 
FIG. 12a        FIG. 12b

*absolute coordinate system*

*image relative coordinate system*

METHOD AND SYSTEM FOR SPATIO-TEMPORAL VIDEO WARPING

RELATED APPLICATONS

This application claims benefit of provisional applications Ser. No. 60/624,896 filed Nov. 5, 2004 and 60/664,371 filed Jan. 18, 2005 whose contents are included herein by reference.

FIELD OF THE INVENTION

This invention relates to image and video based rendering, where new images and videos are created by combining portions from multiple original images of a scene.

PRIOR ART

Prior art references considered to be relevant as a background to the invention are listed below and their contents are incorporated herein by reference. Additional references are mentioned in the above-mentioned U.S. provisional applications Nos. 60/624,896 and 60/664,371 and their contents are incorporated herein by reference. Acknowledgement of the references herein is not to be inferred as meaning that these are in any way relevant to the patentability of the invention disclosed herein. Each reference is identified by a number enclosed in square brackets and accordingly the prior art will be referred to throughout the specification by numbers enclosed in square brackets.

[1] Agarwala, A., Dontcheva, M., Agrawala, M., Drucker, S., Colburn, A., Curless, B., Salesin, D. H., and Cohen, M. F. *Interactive digital photomontage*, ACM Transactions on Graphics Vol. 23, No. 3, August 2004, pp. 294-302.

[2] Baker, H. H., and Bolles, R. C. *Generalizing epipolar-plane image analysis on the spatiotemporal surface*, International Journal of Computer Vision Vol. 3, No. 1, May 1989, pp. 33-49.

[3] Bergen, J. R., Anandan, P., Hanna, K. J., and Hingorani, R. *Hierarchical model-based motion estimation*, European Conference on Computer Vision (ECCV '92), 1992, pp. 237-252.

[4] Bolles, R. C., Baker, H. H., and Marimont, D. H. *Epipolar-plane image analysis: an approach to determining structure from motion*, International Journal of Computer Vision Vol. 1, No. 1, 1987, pp. 7-56.

[5] Carpendale, M. S. T., Light, J., and Pattison, E. *Achieving higher magnification in context*, Proceedings of the 17th annual ACM Symposium on User Interface Software and Technology, 2004, Vol. 6, pp. 71-80.

[6] Cohen, M. F., Colburn, A., and Drucker, S. *Image stacks*, Tech. Rep. MSR-TR-2003-40, Microsoft Research, 2003.

[7] A. Rav-Acha, Y. Pritch, S. Peleg., *Online Video Registration of Dynamic Scenes using Frame Prediction*, Technical Report, Hebrew University of Jerusalem, Israel. (June 2005) subsequently published in IEEE workshop on dynamical vision at ICCV'05, Beijing, October 2005.

[8] Klein, A. W., Sloan, P.-P. J., Colburn, R. A., Finkelstein, A., and Cohen, M. F. *Video cubism*, Tech. Rep. MSR-TR-2001-45, Microsoft Research, April 2001.

[9] Klein, A. W., Sloan, P.-P. J., Finkelstein, A., and Cohen, M. F. *Stylized video cubes*, Proc. Symp Comp Animation (SCA 2002), 2002.

[10] Kwatra, V., Schodl, A., Essa, I., Turk, G., and Bobick, A. *Graphcut textures: image and video synthesis using graph cuts*, ACM Transactions on Graphics Vol. 22, No. 3 July 2003, pp. 277-286.

[11] Zomet, A., Feldman, D., Peleg, S., and Weinshall, D. *Mosaicing new views: The crossed-slits projection*, IEEE Transactions on PAMI, June 2003, pp. 741-754.

[12] K. S. Bhat, S. M. Seitz, J. K. Hodgins, and P. K. Khosla, *Flow-based Video Synthesis and Editing*, SIGGRAPH 2004, pp. 360-363

[13] A. Fitzgibbon *Stochastic rigidity: Image registration for nowhere-static scenes* International Conference on Computer Vision (ICCV'01), Vol. 1, pp. 662-669, Vancouver, Canada, July 2001.

[14] S. Peleg, B. Rousso, A. Rav-Acha, and A. Zomet *Mosaicing on adaptive manifolds*, IEEE Trans. on Pattern Analysis and Machine Intelligence (PAMI'00), 22(10): 1144-1154, October 2000.

[15] A. Schodl, R. Szeliski, D. Salesin, and I. Essa *Video textures* ACM Transactions on Graphics (Proceedings of SIGGRAPH 2000), pp. 489-498, 2000.

[16] P. Torr and A. Zisserman {MLESAC}: *A new robust estimator with application to estimating image geometry*, Journal of Computer Vision and Image Understanding (CVIU'00), 78(1):138-156, 2000.

[17] E. H. Adelson and J. R. Bergen, *The plenoptic function and the elements of early vision*, in *Computational Models of Visual Processing* by M. Landy and J. A. Movshon, Eds. MIT Press, Cambridge, Mass., 3-20, 1991

[18] M. Levoy and P. Hanrahan, *Light field rendering*, Proceedings of SIGGRAPH 96, Addison-Wesley, H. Rushmeier, Ed. Computer Graphics Proceedings, Annual Conference Series, ACM SIGGRAPH, 31-42

[19] P. Rademacher and G. Bishop, *Multiple-center-of-projection images*, Proceedings of SIGGRAPH 98, ACM Press/Addison-Wesley, Ed. Computer Graphics Proceedings, Annual Conference Series, ACM SIGGRAPH, 199-206

[20] M. Irani, P. Anandan, J. Bergen, R. Kumar and S. Hsu, *Mosaic representations of video sequences and their applications*, Signal Processing: Image Communication, 8(4): 327-351, May 1996

[21] S. K. Nayar, *Catadioptric omnidirectional camera*, IEEE Computer Society Conference on Computer Vision and Pattern Recognition (CVPR'97), pages 482-488, Puerto Rico, June 1997

[22] P. Baker, C. Fermller, Y. Aloimonos and R. Pless, *A spherical eye from multiple cameras* (makes better models of the world), IEEE Computer Society Conference on Computer Vision and Pattern Recognition (CVPR'01), volume 1, pages 576-583, Vancouver, Canada, July 2001

[23] T. Beier and S. Neely, *Feature-based image metamorphosis* Computer Graphics (SIGGRAPH '92 Proceedings), E. E. Catmull, Ed. vol. 26, 35-42

[24] J. Zheng and S. Tsuji, *Generating dynamic projection images for scene representation and understanding*, Journal of Computer Vision and Image Understanding (CVIU'98), 72(3):237-256, December 1998

[25] J. Shi and J. Malik, *Motion segmentation and tracking using normalized cuts*, ICCV98, pages 1154-1160, 1998

[26] J. Herman et al, U.S. Pat. No. 6,075,905, issued Jun. 13 2000 Method and apparatus for mosaic image construction

[27] S. Peleg et al., U.S. Pat. No. 6,492,990, issued Dec. 10, 2002. Method for the automatic computerized audio visual dubbing of movies

[28] P. Burt et al., U.S. Pat. No. 6,393,163, issued May 21, 2002. Mosaic based image processing system

[29] S. Peleg et al., U.S. Pat. No. 6,532,036, issued Mar. 11 2003. Generalized panoramic mosaic

[30] S. Peleg et al., U.S. Pat. No. 6,665,003, issued Dec. 16 2003. System and method for generating and displaying panoramic images and movies

[31] S. Peleg et al., U.S. Patent Application 60/624,896. Dynamic mosaicing

[32] S. Peleg et al., US Patent Application 2004/0223051, published Nov. 11, 2004. System and method for capturing and viewing stereoscopic panoramic images

BACKGROUND OF THE INVENTION

While spatial image warping is extensively used in image and video editing applications for creating a wide variety of interesting special effects, there are only very primitive tools for manipulating the temporal flow in a video. For example, tools are available for temporal speeding up (slowing down) of the video comparable to image zoom, or the "in-out" video selection comparable to image crop and shift. But there are no tools that implement the spatio-temporal analogues of more general image warps, such as the various image distortion effects found in common image editing applications.

Imagine a person standing in the middle of a crowded square looking around. When requested to describe his dynamic surrounding, he will usually describe ongoing actions. For example—"some people are talking in the southern corner, others are eating in the north", etc. This kind of a description ignores the chronological time when each activity was observed. Owing to the limited field of view of the human eye, people cannot take in an entire panoramic scene in a single time. Instead, the scene is examined over time as the eyes are scanning it. Nevertheless, this does not prevent us from obtaining a realistic impression of our dynamic surroundings and describing it.

The space-time volume, where the 2D frames of a video sequence are stacked along the time axis was introduced as the epipolar volume by Bolles et al. [2, 4], who analyzed slices perpendicular to the image plane (epipolar plane images) to track features in image sequences.

Light fields are also related to the space-time volume: they correspond to 4D subsets of the general 7D plenoptic function [17], which describes the intensity of light rays at any location, direction, wavelength, and time. Light field rendering algorithms [18] operate on 4D subsets of the plenoptic function, extracting 2D slices corresponding to desired views. The space-time volume is a 3D subset of the plenoptic function, where two dimensions correspond to ray directions, while the third dimension defines the time or the camera position.

Multiple centers of projection images [19] and multiperspective panoramas [30] may also be considered as two-dimensional slices through a space-time volume spanned by a moving camera.

Klein et al. [8, 9] also utilize the space-time volume representation of a video sequence, and explore the use of arbitrary-shaped slices through this volume. This was done in the context of developing new non-photorealistic rendering tools for video, inspired by the Cubist and Futurist art movements. They define the concept of a rendering solid, which is a sub-volume carved out from the space-time volume, and generate a non-photorealistic video by compositing planar slices which advance through these solids.

Cohen et al. [6] describe how a non-planar slice through a stack of images (which is essentially a space-time volume) could be used to combine different parts from images captured at different times to form a single still image. This idea was further explored by Agarwala et al. [1]. Their "digital photomontage" system presents the user with a stack of images as a single, three-dimensional entity. The goal of their system is to produce a single composite still image, and they have not discussed the possibilities of generating dynamic movies from such 3D image stacks. For example, they discuss the creation of a stroboscopic visualization of a moving subject from a video sequence, but not the manipulation of the video segment to produce a novel video.

Video textures [Kwatra et al. [10]] and graphcut textures [Schödl et al. [15]] are also related to this work, as they describe techniques for video-based rendering. Schödl et al. generate new videos from existing ones by finding good transition points in the video sequence, while Kwatra et al. show how the quality of such transitions may be improved by using more general cuts through the space-time volume.

The above-mentioned publications are not directed to meaningful ways in which the user may specify and control various spatio-temporal warps of dynamic video sequences, resulting in a variety of interesting and useful effects.

While it is known to process a sequence of video image frames by using video content from different frames and merging such content so as to create a new frame, known approaches have mostly focused on producing still images using photo-montage techniques or have required translation of the camera relative to the scene.

1. Related Work

The most popular approach for the mosaicing of dynamic scenes is to compress all of the scene information into a single static mosaic image. The description of scene dynamics in a static mosaic varies. Early approaches eliminated all dynamic information from the scene, as dynamic changes between images were undesired [16]. More recent methods encapsulate the dynamics of the scene by overlaying several appearances of the moving objects into the static mosaic, resulting in a "stroboscopic" effect [1].

An attempt to incorporate the panoramic view with the dynamic scene was proposed in [20]. The original video frames were played on top of the panoramic static mosaic, registered into their location in the mosaic. The resulting video is mostly stationary, and motion is visible only at the location of the current frame.

The present invention addresses the problem of generating the impression of a realistic panoramic video, in which all activities take place simultaneously. The most common method to obtain such panoramic videos is to equip a video camera with a panoramic lens [21]. Indeed, if all cameras were equipped with a panoramic lens, life could have been easier for computer vision. Unfortunately, use of such lens is not convenient, and it suffers from many quality problems such as low resolution and distortions. Alternatively, panoramic videos can be created by stitching together regular videos from several cameras having overlapping field of view [22]. In either case, these solutions require equipment which is not available for the common video user.

In many cases a preliminary task before mosaicing is motion analysis for the alignment of the input video frames. Many motion analysis methods exist, some offer robust motion computation that overcome the presence of moving objects in the scene [3, 16]. A method proposed by [13] allows image motion to be computed even with dynamic texture, and in [7] motion is computed for dynamic scenes.

SUMMARY OF THE INVENTION

It is an object of the invention to provide a method and computer system for transforming a first sequence of video frames of a first dynamic scene captured at regular time intervals by a camera to a second sequence of video frames depicting a second dynamic scene.

This object is realized in accordance with one aspect of the invention by a computer-implemented method for transforming a first sequence of video frames of a first dynamic scene captured at regular time intervals to a second sequence of video frames depicting a second dynamic scene, the method comprising:

(a) for at least two successive frames of the second sequence, selecting from at least three different frames of the first sequence portions that are spatially contiguous in the first dynamic scene; and (b) copying said portions to a corresponding frame of the second sequence so as to maintain their spatial continuity in the first sequence.

Within the context of the invention and the appended claims, the term "video" is synonymous with "movie" in its most general term providing only that it is accessible as a computer image file amenable to post-processing and includes any kind of movie file e.g. digital, analog. The camera is preferably at a fixed location by which is meant that it can rotate and zoom—but is not subjected translation motion as is done in hitherto-proposed techniques. The scenes with the present invention is concerned are dynamic as opposed, for example, to the static scenes processed in U.S. Pat. No. 6,665,003 [30] and other references directed to the display of stereoscopic images which does not depict a dynamic scene wherein successive frames have spatial and temporal continuity.

When the camera is stationary, contiguous portions in the frames are contiguous in the first dynamic scene; stationary background objects in the first dynamic scene remain stationary in the second dynamic scene.

Preferably, the first sequence of video frames is preprocessed so as to generate an aligned video having an aligned sequence of frames by:

(a) computing image motion parameters between frames in the first sequence;

(b) warping the video frames in the first sequence so that stationary objects in the first dynamic scene will be stationary in the video.

By such means, the stationary objects remain stationary also in the aligned sequence so that they do not move in the aligned video.

When a video camera is scanning a dynamic scene, different regions are visible at different times. The chronological time when a region becomes visible in the input video is not part of the scene dynamics, and may be ignored. Only the "relative time" during the visibility period of each region is relevant for the dynamics of the scene, and should be used for building the dynamic mosaics. The distinction between chrono-logical time and relative time for describing dynamic scenes inspired this work. No mathematically correct panoramic video of a dynamic scene can be constructed, as different parts of the scene are seen in different times. Yet, panoramic videos giving a realistic impression of the dynamic environment can be generated by relaxing the chronological requirement, and maintaining only the relative time.

In order to describe the invention use will be made of a construct that we refer to as the "space-time volume" to create the dynamic panoramic videos. The space-time volume may be constructed from the input sequence of images by sequentially stacking all the frames along the time axis. However, it is to be understood that so far as actual implementation is concerned, it is not necessary actually to construct the space-time volume for example by actually stacking in time 2D frames of a dynamic source scene. More typically, source frames are processed individually to construct target frames but it will aid understanding to refer to the space time volume as though it is a physical construct rather than a conceptual construct. With this in mind, we show how panoramic movies can be produced by taking different slices of the space time volume. Methods similar to those used in ordinary mosaicing obtain seamless images from slices of the space time volume, giving the name "Dynamic Mosaics" ("Dynamosaics"). Various slicing schemes of the space-time volume can manipulate the chronological time in different ways. For example, the scanning video can be played at a different speed, even backwards, while preserving the relative time characteristics of the original video.

Panoramic video is a temporally compact representation of video clips scanning a scene, useful as a video summary tool. In addition it can be used for video editing as well as for entertainment. However, since manipulation of chronological time as proposed in this paper is a new concept, it is expected that new innovative applications will develop over time.

One aspect of the invention lies in generalizing from planar and non-deforming time fronts to free-form and deforming ones; synthesizing entire videos, rather than still images; and exploring some of the video editing effects that may be achieved in this manner. While some of these effects are not new per se, we demonstrate that they all fit nicely within the powerful and flexible evolving time fronts paradigm.

An alternative embodiment for the user interface allows the user to control the shape and the evolution of the time front via a sparse set of constraints. One type of constraint forces the time front to pass through a user-specified point in the space-time volume at a given frame of the output video sequence. Another type of constraint forces the time front to advance at some user-specified speed when passing through certain user-specified points in the space-time volume. Piecewise smooth evolving time fronts that satisfy these constraints may be obtained by formulating an objective function consisting of two terms: a data term which measures the deviation from the desired constraints, and a smoothness term, which forces the solution to be piecewise smooth. The resulting function may then be minimized using a number of numerical methods known to any experienced practitioner in the field, such as described in "*Numerical Recipes: The Art of Scientific Computing*" developed by Numerical Recipes Software and published by Cambridge University Press.

In accordance with another aspect of the invention there is provided a computer-implemented method for transforming a first sequence of video frames of a first dynamic scene captured at regular time intervals to a second sequence of video frames depicting a second dynamic scene, the method comprising:

(a) capturing at least two events having a first mutual temporal relationship in the first sequence; and (b) displaying said at least two events in the second sequence so as to define a second mutual temporal relationship that is different from the first mutual temporal relationship.

Such a method may be used to display events that occurred simultaneously in the first sequence at different times in the second sequence or to display events that occurred at different times in the first sequence simultaneously in the second sequence, and may include:

(c) for at least one feature in the first dynamic scene sampling respective portions of the first sequence of video frames at a different temporal rate than surrounding portions of the first sequence of video frames; and (d) copying sampled portions of the first sequence of video frames to a corresponding frame of the second sequence.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 4a, 4b and 4c show respectively frames from a source video sequence and from two target video clips generated from the source video sequence with different time flow patterns;

FIGS. 4d and 4e show several time slices superimposed over a u-t slice passing through the center of the space-time volume;

FIGS. 6a, 6b and 6c show evolving time fronts and corresponding effects used to generate a spatio-temporal magnifying glass;

FIGS. 8b and 8c show respectively frames from a source video sequence and from a target video clip generated from the source video sequence with the time flow pattern of FIG. 8a;

FIG. 11 is a schematic representation showing effects of various non-linear slices on the space-time volume of an input sequence from a rotating camera;

FIGS. 12 and 12b show parallax of two "stereo" views generated from a space time volume captured by a translating camera;

FIGS. 13b and 13c show forward parallax of two "stereo" views generated from a space time volume captured by a translating camera and created using the rotating time front shown in FIG. 13a;

FIGS. 15a, 15b, 16a and 16b show examples of a single frame from panoramic dynamosaics for different types of scenes created using the invention;

DETAILED DESCRIPTION OF EXEMPLARY EMBODIMENTS

1. The Evolving Time Fronts Framework

The invention creates a spatio-temporal video warping framework with which there are associated three conceptual stages: constructing a space-time volume, sweeping the volume with an evolving time front surface, and mapping the resulting time slices to produce the warped output video frames. Before proceeding with a more detailed description of the process, we introduce the notation for the different coordinates systems involved:

1. Original video coordinates (x,y,t) denote the (x,y) location in input video frame t, where (x, y) are given in the local coordinate system of each frame.
2. Registered space-time coordinates (u,v,t), denote locations in the space-time volume. Here (u,v) refer to some global coordinate system available after video registration.
3. Warped video coordinates (x',y',t') denote the (x',y') location in the output video frame t', again, in the local coordinate system of each frame.

1.1. The Space-Time Volume

Given a sequence of input video frames, they are first registered and aligned to a global spatial coordinate system (u,v). This defines a mapping $R(x,y,t) \rightarrow (u,v,t)$, typically leaving t unchanged, and only warping the spatial coordinates of each frame to their place on the global manifold. The necessary registration may be performed using previously described computer vision techniques [3, 13] both of which are incorporated herein by reference.

Figure 1A:
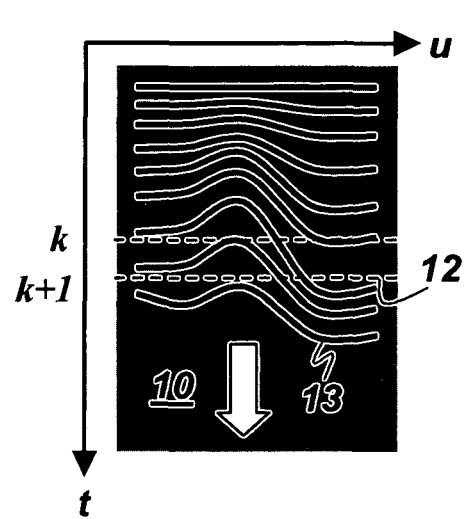
FIGS. 1a and 1b are pictorial representations (viewed from top) showing 3D space-time volumes produced using stationary and moving cameras, respectively.
Figure 1B:
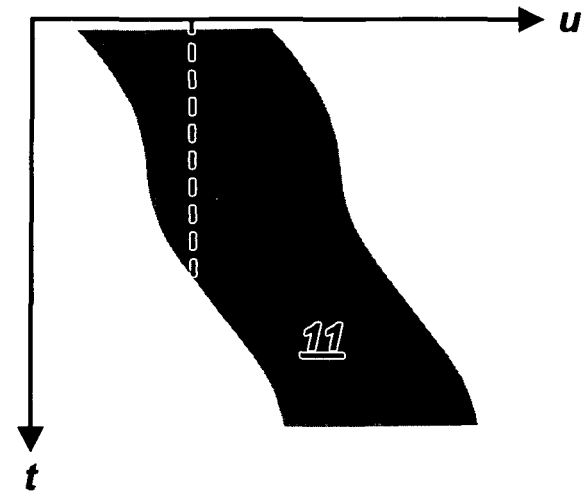
Figure 8A:
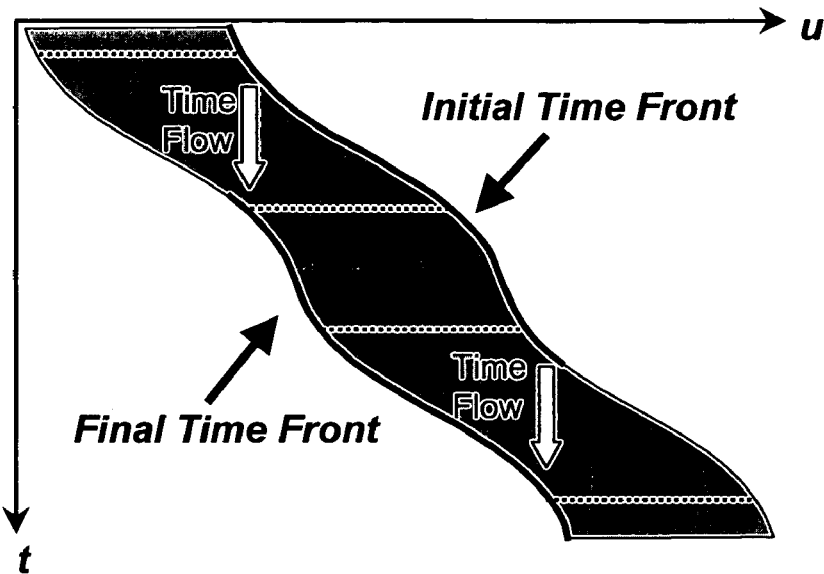
FIG. 8a shows a time flow pattern for generating dynamic mosaics from a panning camera.
Figure 8B:
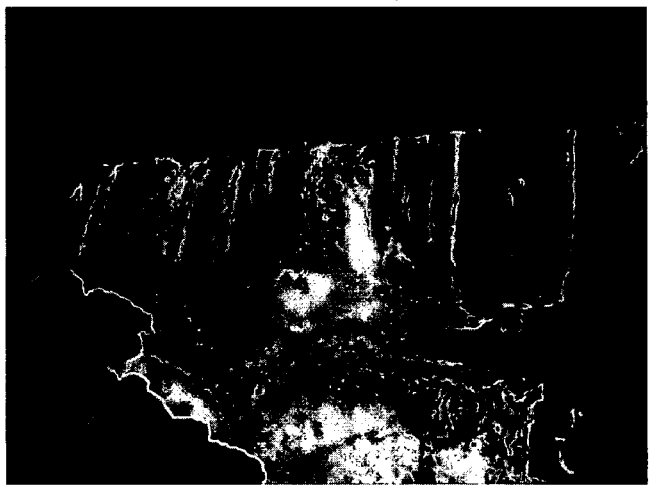
Figure 8C:
Figure 8D:
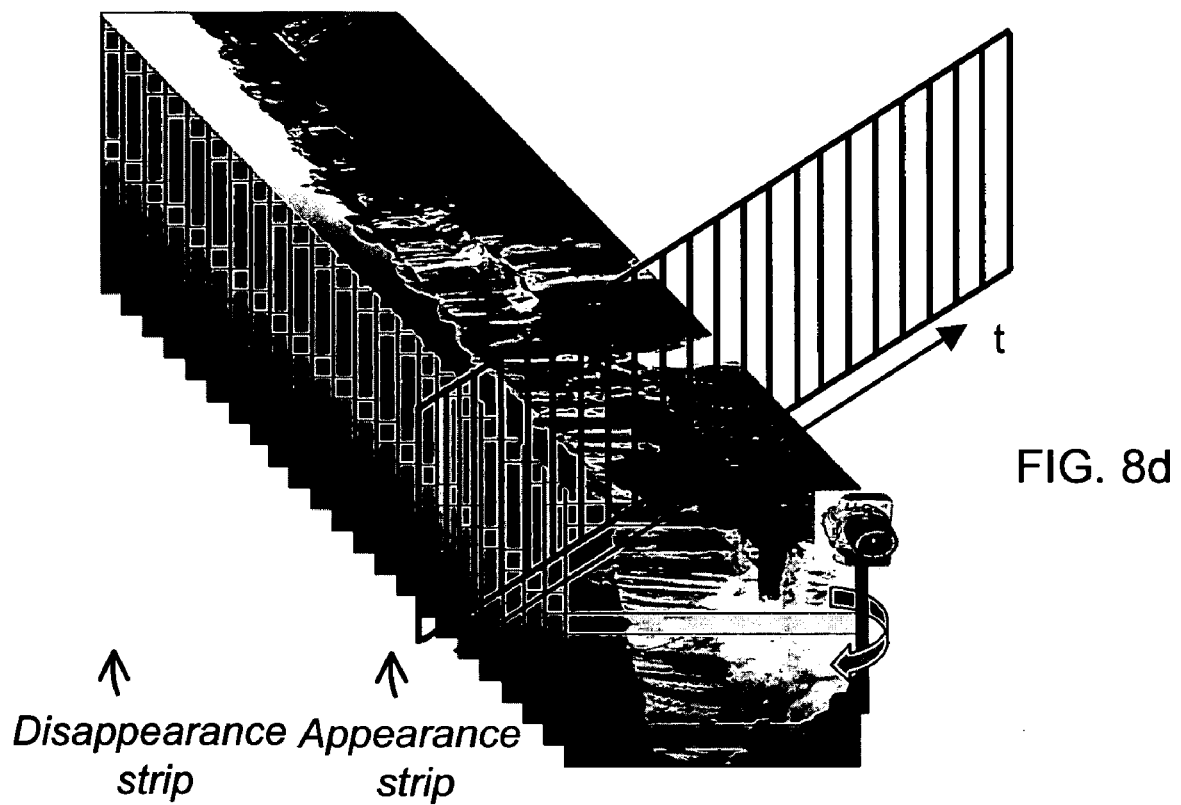
FIGS. 8d and 8e are pictorial and schematic representations respectively showing the construction according to an exemplary embodiment of the invention for creating panoramic dynamic mosaics.

FIGS. 1a and 1b are pictorial representations showing in plan view 3D space-time volumes 10 and 11 respectively comprising a plurality of 2D images stacked along the time axis. A stack of 2D images constituting a 3D space-time relating to a different embodiment of the invention is also shown in FIG. 8d. Each video frame is represented by a ID row 12, and the video frames are aligned along the global u axis. In FIG. 1a a static camera is used to define the rectangular space-time region 10, while a moving camera defines the more general swept volume 11 shown in FIG. 1b. Stacking the aligned 2D video frames along the time axis results in the 3D space-time volumes 10 and 11. As shown in FIG. 1a, for a static camera the volume is shaped as a rectangular box, while a moving camera defines a more general swept volume. In either case, planar slices perpendicular to the t axis correspond to the original video frames. A static scene point traces a line parallel to the t axis (for a static or panning camera), while a moving point traces a more general trajectory. An example for the location of a static point 15 is the dashed line 16 in FIG. 1b.

3.2. The Time Front

The invention proposes a number of different ways of transforming one space-time volume into another, yielding a novel video sequence but it is to be understood that these are non-limiting. In the most general case, each pixel (x',y',t') in the target video may be generated by an arbitrary function of the entire original source space-time volume. In practice, however, such general transformations could turn out to be unintuitive and difficult to specify. Thus, for the purpose of explanation, we will focus on a more restrictive class of transformations that correspond to meaningful spatio-temporal manipulations of the video.

Spatial image warping geometrically transforms images, typically by applying a bijective mapping to transform the spatial coordinates of an input image to yield the warped image. Informally, this allows a user to change the position and size of various features in the image, but without breaking continuity. By the same token, a user is able to specify new spatio-temporal locations and sizes for various regions in the original space-time volume. For example, shrinking (stretching) a region along the temporal dimension causes time to flow faster (slower) in the warped video. Preferably, mappings are bijective in order to maintain a continuous spatio-temporal flow.

Figure 2A:
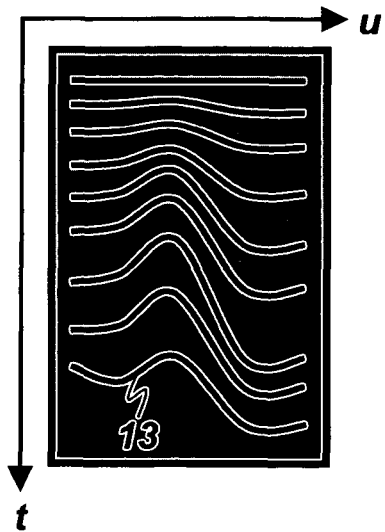
FIG. 2a is a pictorial representation depicting snapshots of an evolving time front surface that produce a sequence of time fronts.
Figure 2B:
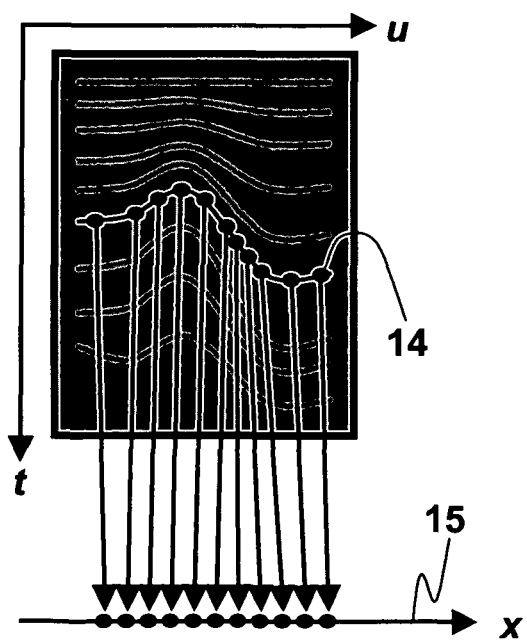
FIG. 2b is a pictorial representation depicting mapping each time front to produce a single output video frame.

One possible approach according to the invention, and one that has the desired characteristics outlined above, is to define the warping by specifying an evolving time front—a free-form surface 13 that deforms as it sweeps through the space-time volume and an upper edge of which is shown in FIGS. 2a and 2b. Thus, FIG. 2a shows snapshots of an evolving time front surface producing a sequence of time fronts 13 that intersect multiple frames 12. In FIG. 2b each time front is mapped to produce a single output video frame. This is done by mapping the pixels 14 in each frame 12 that are intersected by the evolving time front 13 and projecting on to a target video frame 15, such that projections of successive time fronts form a successive series of video frames in the target video.

Figure 3A:
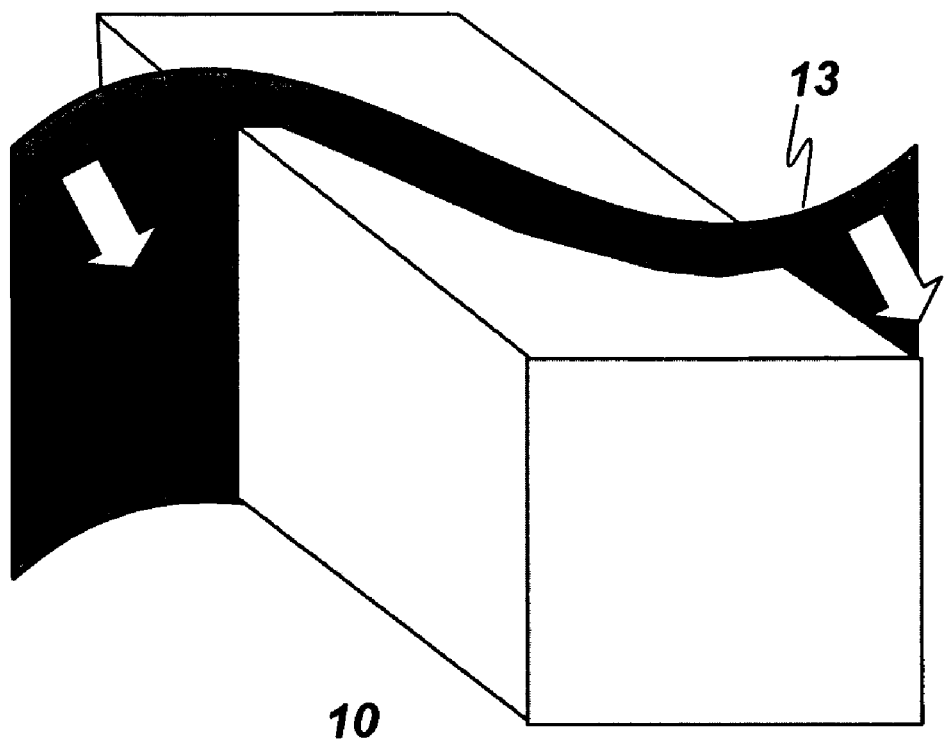
FIGS. 3a and 3b are pictorial representations showing successive stages during sweeping 3D space-time volumes with an evolving 2D time front.
Figure 3B:
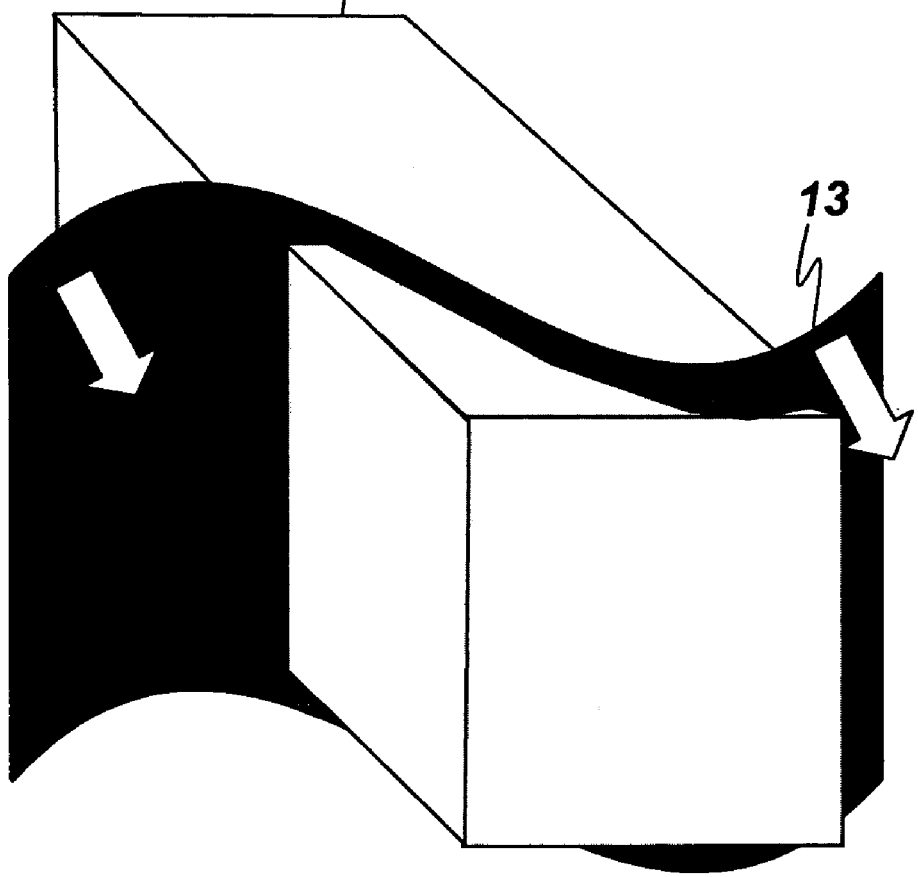

FIGS. 3a and 3b are pictorial representations showing successive stages during sweeping the 3D space-time volume 10 with the evolving 2D time front 13.

Specifying the spatio-temporal warping in this manner separates between the manipulation of the temporal and the spatial components of the video and provides an intuitive interface for controlling such warps. For example, we can slow down or speed up the time flow in various regions at will by varying the speed at which the time front advances in the corresponding regions of the space-time volume.

3.3. User Interface

Some of the effects described herein are generated with very specific and well-defined time front geometries. A video editing tool may present such effects to the user as a black box with a few input parameters that control the outcome. In other cases, a more elaborate user interface is required.

The temporal evolution of general time fronts and the speed at which they sweeps through the space-time volume may be specified via a keyframing user interface, similar to the interfaces used in computer animation. The user is required to specify a number of key time slices and indicate which output frames these slices correspond to. By interpolating between these key slices a continuously evolving time front is defined, which is then sampled at the appropriate time intervals to compute a time slice for each output frame.

Two different user interfaces were employed for shaping the key time slices: (i) defining a free-form surface by manipulating a control mesh and (ii) a painting interface. In the latter interface the user starts with a gray image corresponding to a planar time slice perpendicular to the time axis and paints on it with a soft-edged brush. Darker colors are used to displace the time slice backwards in time, while brighter colors advance it forward. Both interfaces provide feedback to the user by displaying the image defined by the manipulated time slice.

As for defining the spatial warp between the resulting time slices and output frames, it has been found that simple parallel projection of the slice on to a plane perpendicular to the t axis is sufficient for many useful video manipulations. However, in order to define a more general spatio-temporal mapping (as in the spatio-temporal magnifying glass described below with reference to FIGS. 6a and 6b) it is possible to use any spatial image warping interface, such as [23].

In the next sections we discuss several different embodiments for time front evolution, and explain the corresponding video warping effects.

4. Spatially Varying Time Flow

With further reference to the space-time volume 10 generated from a video of a dynamic scene captured by a static camera shown in FIG. 1a. The original video may be reconstructed from this volume by sweeping forward in time with a planar time front perpendicular to the time axis. As explained above dynamic events in the video can be manipulated by varying the shape and speed of the time front as it sweeps through the space-time volume.

FIGS. 4b and 4c demonstrate two different manipulations of a video clip capturing the demolition of a stadium. In the original clip shown in FIG. 4a, the entire stadium collapses almost uniformly. By sweeping the space-time volume as shown in FIG. 4e the output frames use time fronts that are ahead in time towards the sides of the frame, causing the sides of the stadium to collapse before the center (FIG. 4c). Sweeping with the time fronts in FIG. 4d produces a clip where the collapse begins at the dome and spreads outward (FIG. 4b), as points in the center of the frame are taken ahead in time. It should be noted that Agarwala et al. [1] used the very same input clip to produce still time-lapse mosaic images where time appears to flow in different directions (e.g., left-to-right or top-to-bottom). This was done using graph-cut optimization in conjunction with a suitable image objective function. In contrast, the framework according to this aspect of the invention generates entire new dynamic video clips.

Because of the unstructured nature of the expanding dust clouds in this example, it was possible to obtain satisfactory results without graph-cuts optimization. In more structured cases, graph-cuts [1] may be used to make time slices appear seamless by introducing local temporal displacements into each time slice.

Figure 5A:
FIGS. 5a and 5b show frames from two different target videos derived from a source video of a swimming competition that is configured to yield different winners.
Figure 5B:
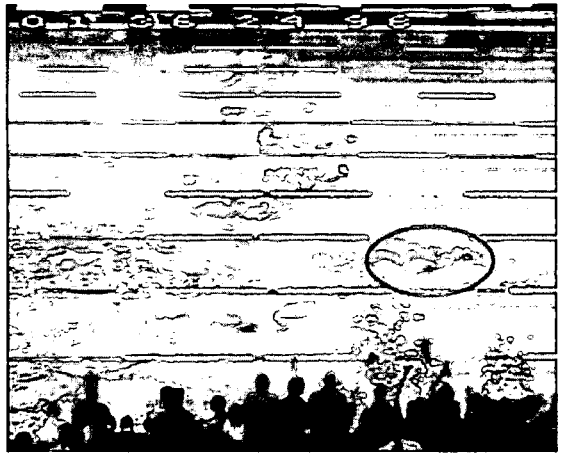
Figure 5C:
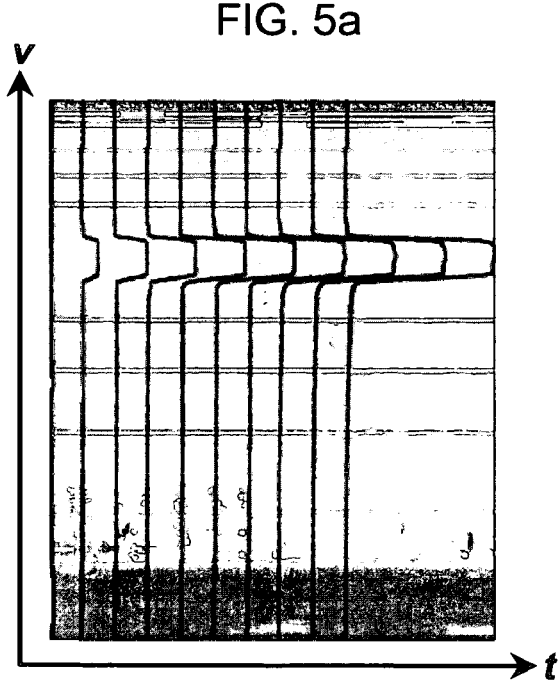
FIGS. 5c and 5d show corresponding time slices superimposed over a v-t slice passing through the center of the space-time volume of the swimming competition; p
Figure 5D:
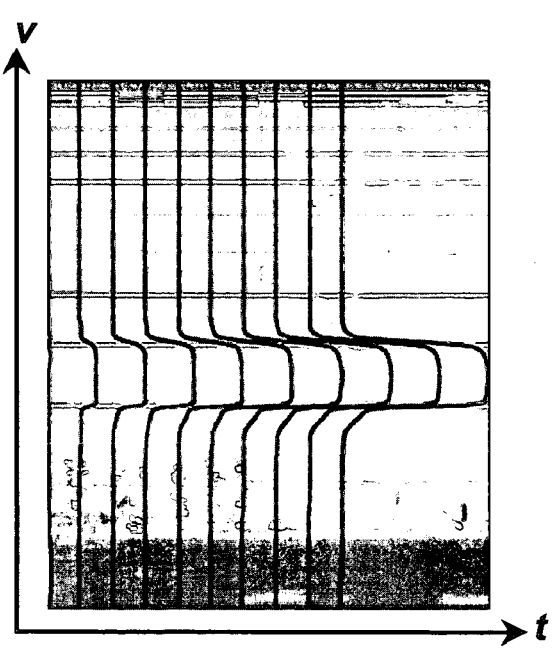

Another example is shown in FIGS. 5a and 5b showing alternative target video clips of a swimming competition derived from a source video (not shown) taken by a stationary camera. Competitors swim in respective lanes that are delineated by the ropes spanning the length of the pool. FIGS. 5c and 5d show the shape of corresponding time slices used to offset the time front at regions of the space-time volume corresponding to a particular lane thereby allowing the corresponding swimmer to be speeded up, thus altering the outcome of the competition at will. In FIGS. 5c and 5d the respective time fronts are offset in different lanes but are both directed forward in the direction of time, thereby speeding up the corresponding swimmer. However, the opposite effect can equally be achieved directing the offset time front backward against the direction of time, thereby slowing down the corresponding swimmer, or even making the swimmer appear to swim backwards.

In such an example, the swimmer represents a feature of the first dynamic scene and the method according to the invention includes sampling respective portions of the first sequence of video frames for the swimmer at a different rate than surrounding portions of the first sequence of video frames; and copying sampled portions of the first sequence of video frames to a corresponding frame of the second sequence. The same technique may be done for more than one feature in the first dynamic scene.

This example takes advantage of the fact that the trajectories of the swimmers are parallel. In general, it is not necessary for the trajectories to be parallel, or even linear, but it is important that the tube-like swept volumes that correspond to the moving objects in space-time do not intersect. If they do, various anomalies, such as duplication of objects, may arise.

Another interesting application is dubbing a video with a different soundtrack. The new soundtrack rarely matches the lip motion of the original video, and particularly disturbing are cases when the mouth moves but no sound is heard, or when sound is heard but the mouth does not move. This problem can be partially overcome by using the approach described herein. The mouth motion can be accelerated or slowed down using an appropriate time flow, such that only the spoken moments correspond to mouth motions, while during silent moments the mouth does not move. If the head is moving, head tracking as known in the art [27] can be performed, so that the different times will be taken from the same mouth area even though the head may be in different locations.

5. Spatio-Temporal Magnifying Glass

While the previous examples have demonstrated only time manipulations, in a general spatio-temporal mapping the spatial coordinates may be manipulated simultaneously with the temporal ones. In this case, all three output video coordinates $(x',y',t')$ are functions of the space-time coordinates $(u,v,t)$. That is, $$(x',y',t')=(f_x(u,v,t),f_y(u,v,t),f_t(u,v,t)).$$

This more general spatio-temporal warp provides a tool for creating additional interesting and useful effects. For example, a spatio-temporal magnifying glass can be applied to videos of sport events. Such a device enables us to magnify a spatial region in which some particularly interesting action takes place, while simultaneously slowing down the action. Unlike in ordinary instant replay, in this case the spatial and temporal magnification occur in the original context of the action, with a continuous transition between the magnified and the surrounding regions. Thus, when a basketball player dunks the ball into the basket, the viewer is able to see the dunk in greater detail, and at the same time keep track of the other players. Although not essential to an understanding of the invention, this effect is demonstrated in several video clips that are accessible from our website at http://www.vision.huji.ac.il/P1604032/.

Figure 6C:
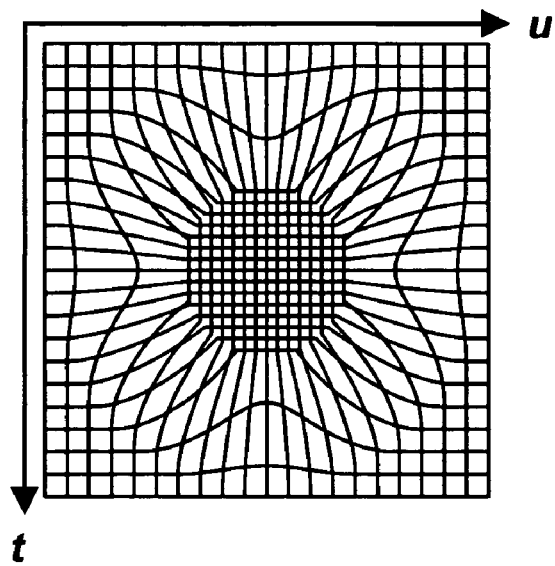
Figure 6C:
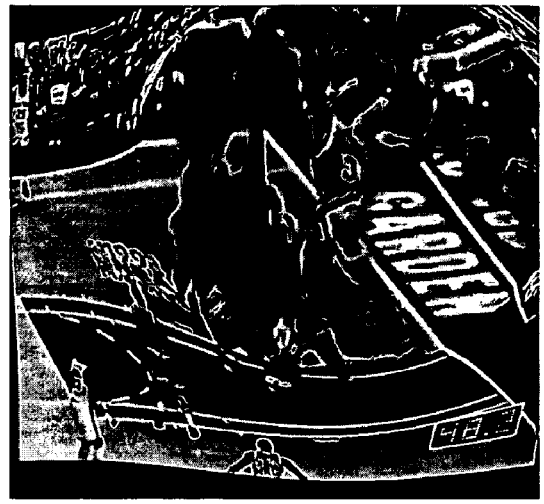
Figure 6C:
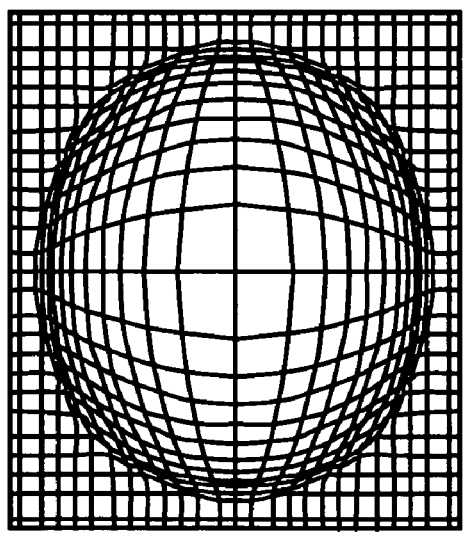

The magnifying glass effect is achieved by deforming and warping the time fronts as illustrated in FIG. 6a showing a slice of the space-time volume with horizontal curves describing the evolution of the time front. The vertical curves define the warping on the time slices to the frames of the output video. Both the horizontal curves and the vertical curves are mapped to straight lines in the resulting output video. The dense grid in the center of the diagram is the focal volume of the lens, and will be enlarged both in space and in time in the output video. Action taking place inside this volume is both magnified and slowed down, while action outside this volume (but still inside the lens) is compressed and accelerated. Everything entirely outside the lens remains unaffected. This is shown in FIG. 6b where the denser spacing of the evolving time fronts represented by the horizontal curves and of their spatial time warping represented by the vertical curves creates a "bubble" in which the image is magnified and slowed down. In other words, time flow is accelerated when entering the lens, slows down in the central focal region, and accelerates again when exiting, to "catch up" with the time flow outside the lens. The spatial dimensions are affected in an analogous way (shrinking when entering/exiting the lens and expanding inside the focal volume). Specifically, a slightly modified version of the clamped focal radius lens is used with the Gaussian drop-off function, as proposed by Carpendale et al. [5]. The opposite effect may be achieved by deforming and warping the time fronts as illustrated in FIG. 6c whereby a "bubble" is created wherein the image is reduced in size and speeded up.

While the spatial and temporal mappings are inter-related, a different magnification factor may be applied in each domain. In this effect no registration of the input video frames was performed; the space-time volume was formed by simply stacking the frames on top of each other. The user may control the effect by keyframing the center of the magnifying glass, specifying the magnification factors, and the drop-off function parameters. Instead of keyframing, automatic tracking of moving objects may also be used to position the magnifying glass over a moving object.

The amount of useful spatial and temporal magnification depends on the spatial and temporal resolution of the source video. The duration of the effect may also be limited to a short period of time if temporal continuity is to be maintained: if a subject is permitted to spend too much time inside the lens, the temporal disparity between the time flow inside and outside the lens may become too great.

6. Patterns from Temporal Shifts

Figure 7:
FIG. 7 is a pictorial representation of a video frame showing a dynamic pattern formed over a dynamic texture of fire and smoke.

Mildly displacing the time front preserves the characteristics of the original video, but more abrupt displacements may introduce visible distortions in dynamic potions of the video. We can take advantage of such distortions to "emboss" various patterns over dynamic textures. For example, we have created text and logos over dynamic textures of fire and of water. We start by rasterizing the desired embossed shape to a binary image, and then displace the points in the interior of the shape forward or backward in time based on their distance from the shape's boundary. For example, for points closer to the boundary than some user specified value w, the displacement may be linear in the distance, and constant for the remaining interior points. The resulting time front surface is then used to sweep through the space-time volume to produce the resulting video. A frame from one such video is shown in FIG. 7. By starting and ending with the original planar time fronts we can make the pattern gradually emerge and disappear.

Note that the resulting effect is only visible in dynamic potions of the original video, and works best when there is sufficient fluctuation in brightness or in color. An interesting alternative which we have yet to explore is to animate the pattern used to define the displacement.

7. Dynamic Mosaics

Traditional mosaicing from a panning camera creates static panoramic images even when the scene is dynamic. By using appropriate time flow patterns, dynamic panoramic movies can be produced from a panning camera scanning a dynamic scene. FIG. 8*a* shows a time-flow pattern over a space-time volume, and assumes a camera panning from left to right of a source scene a frame of which is shown in FIG. 8*b*. In this time flow pattern, the initial time front is passing through the right side of each input frame, where regions are captured as they first enter the camera's field of view. Thus, the first time slice is a panoramic image capturing the earliest appearance of each point in the scene. The final time front is passing through the left side of each frame, where regions are captured just before leaving the field of view. This time slice shows the last appearance of each point in the scene. Similarly, each intermediate time slice (generated by linear interpolation) corresponds to an image where each region is captured at some time between entering and exiting the field of view. Although each panorama consists of regions taken from different points in time, the local dynamics inside each region is preserved. For example, in a waterfall scene, water in each region will be seen flowing down. FIG. 8*c* shows a single panorama from such a movie. In this example, the effect is enabled by the fact that the motion inside each region (water flow) is roughly perpendicular to the panning direction.

7.1. Mosaicing with Strips

Figure 8E:
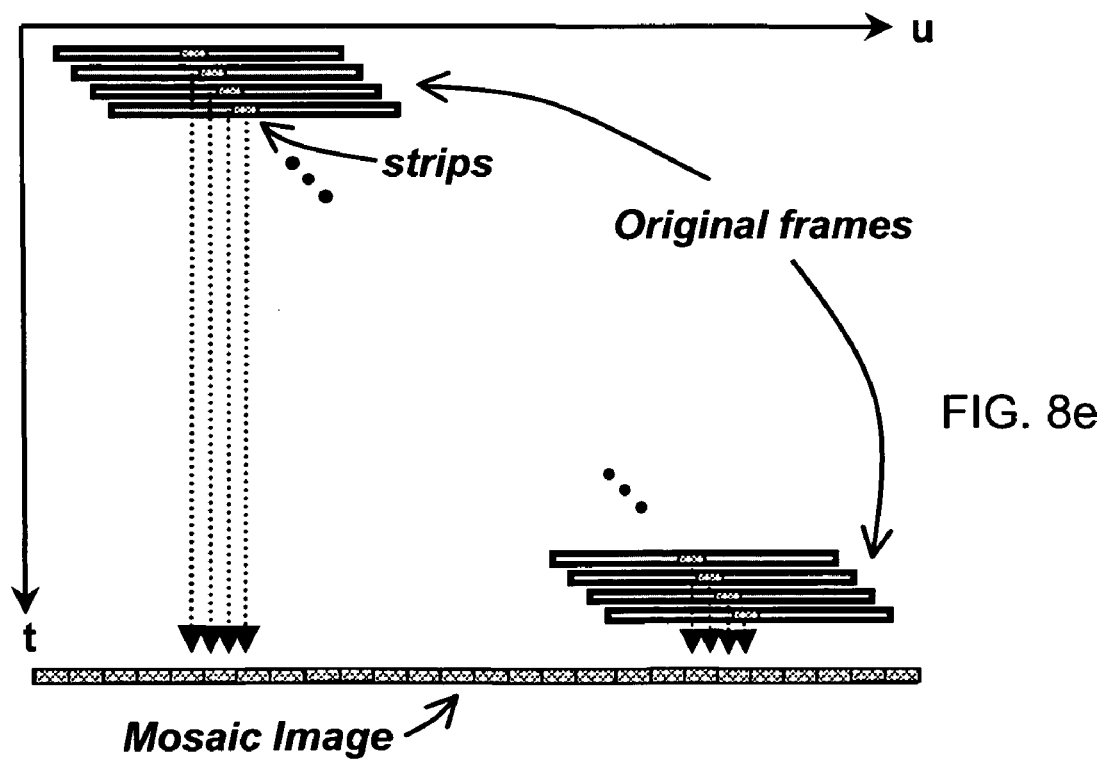

FIG. 8*d* depicts pictorially an exemplary embodiment of the present invention of a mosaicing scheme whereby strips are taken from each image and pasted side by side to form the mosaic image. The figure shows the collection of input frames as a space-time volume, where strips are taken from each image to form a mosaic image. For simplicity we assume that the camera is panning, image motion is mainly horizontal, and therefore only vertical strips are used. FIG. 8*e l gives a* 2D display of the mosaicing process, assuming a fixed y coordinate. In this figure all images were aligned along the u axis, and a central strip was taken from each image to form the panoramic mosaic. The collection of all strips in the space-time (u-t) volume forms a "slice" in this volume going through the center of all frames.

7.2. Mosaicing by Slicing the Space-Time Volume

Image mosaicing can be described by a function which maps each pixel in the synthesized mosaic image to the input frame from which this pixel is taken. In the aligned sequences, this also determines the location of the pixel in the selected frame. When only vertical strips are used, the function is one-dimensional: it determines for each column of the mosaic image, the frame from which this column should be taken.

Figure 8F:
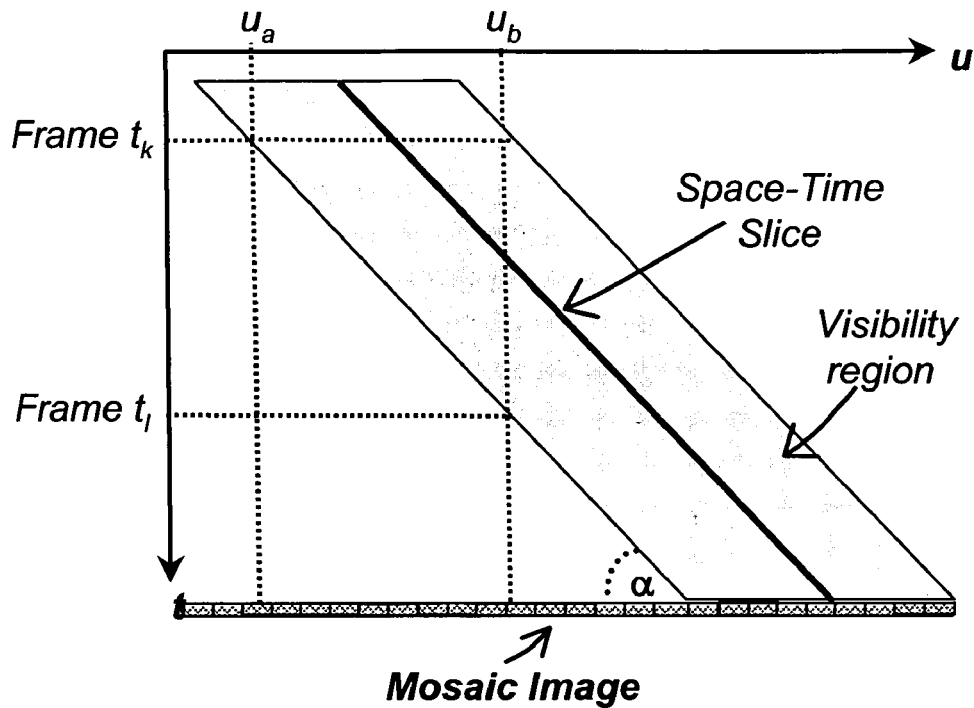
FIGS. 8f and 8g are schematic representations of a continuous linear slice in the continuous space-time volume used for creating panoramic dynamic mosaics.

The discrete mosaicing function can be represented by a continuous slice in the continuous space-time (u-t) volume as shown in FIG. 8*f*. Each continuous slice determines the mosaic strips by its intersection with the frames of the original sequence at the actual discrete time values. In the non-linear slice, the slope at region A was reduced to zero, while the slope at region B was increased. As a result, objects in A will not be distorted.

7.3. Creating Panoramic Dynamosaics

Figure 8G:
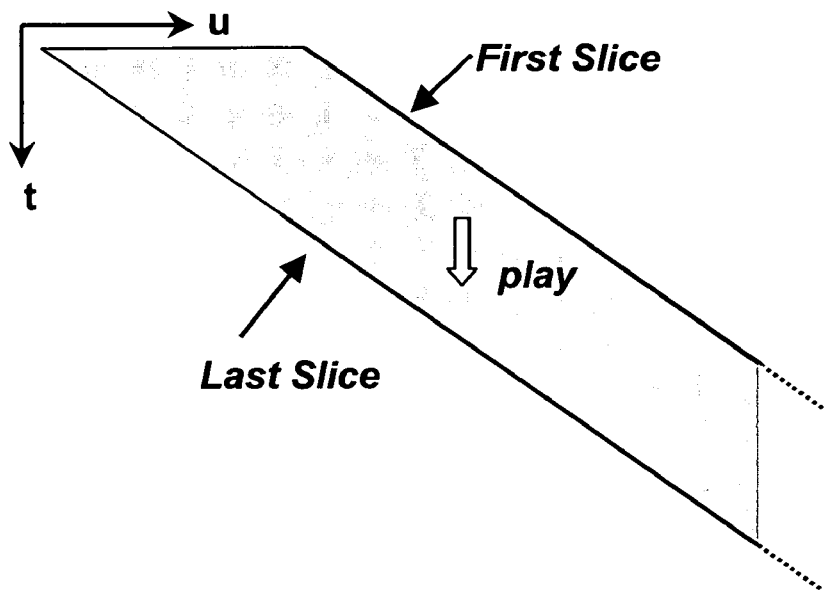

The invention makes use of the space-time representation to produce dynamic panoramic movies by generating sequences of mosaic images corresponding to varying slices of the space-time volume as shown in FIG. 8*g*.

The first mosaic in the sequence is constructed from strips taken from the right side of each input frame, which display regions as they first enter the movie. This mosaic image displays the first appearance of all regions as did the right strips in FIG. 8*d*. The last mosaic in the sequence is the mosaic generated from the strips in the left, just before a region leaves the field of view. This mosaic image displays the last appearance of all regions in the movie. Between these two extreme slices of the space-time volume, corresponding to the appearance and disappearance of scene regions, intermediate panoramic images are used that are represented by slices moving smoothly from the first slice to the last slice. These slices are panoramic images, advancing along the relative time from the "appearance" slice to the "disappearance" slice, where the local dynamics of each region is preserved. A panoramic dynamosaic movie is produced by moving the first slice slowly towards the last slice and generating multiple panoramic images. FIG. 8*c* shows a single panorama from such a movie.

Panoramic dynamosaics represent the elimination of the chronological time of the scanning camera. Instead, all regions appear simultaneously according to the relative time of their visibility period: from their first appearance to their disappearance. But there is more to time manipulation than eliminating the chronological time as will now be explained with regard to the relationships between time manipulations and various slicing schemes.

7.4. Chronological Time Manipulation

The manipulation of chronological time vs. relative time using dynamosaicing will now be described. The dynamic panoramas described in the previous section are a simple example of this concept when the chronological time has been eliminated. Chronological time manipulation is not limited to the creation of dynamic panoramic videos. It can be useful for any application where a video should be manipulated in a way that changes the chronological order of objects in the scene. The realistic appearances of the movie is preserved by preserving the relative time, even when the chronological time is changed.

7.5. Advancing backwards in Time

The original waterfalls video, a frame of which is shown in FIG. 8*b*, was captured by a video camera panning from left to right. If we wanted to reverse the scanning direction and create a video where the camera is panning from right to left, we could simply reverse the order of frames in the video, but this would result in the water flowing upward. At a first glance, it seems impossible to play a movie backwards without reversing its dynamics. Yet, the distinction between chronological and relative times as provided by the invention allows the scanning order to be reversed without distorting the relative time. Thus, looking at dynamosaic panoramic movies, one can claim that all objects are moving simultaneously, and the scanning direction does not have any role. Thus, there must be some kind of symmetry, which enables to convert the panoramic movie into a scanning sequence in which the scanning is at any desired direction and speed.

Figure 9:
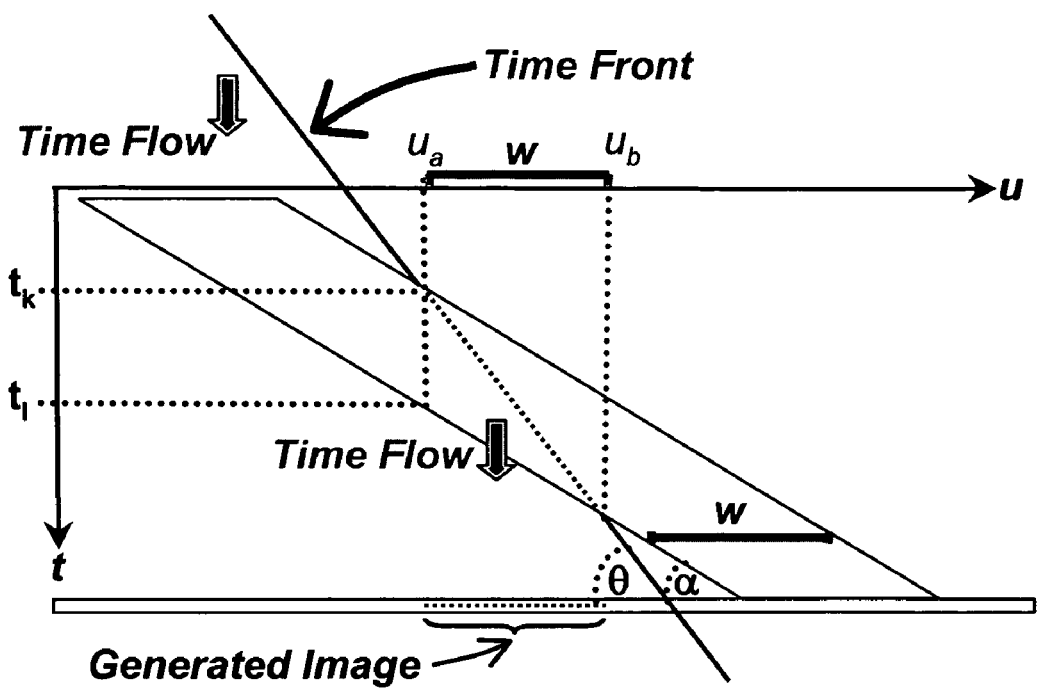
FIG. 9 shows a time flow pattern for generating dynamic mosaics from a panning camera while reversing the scanning direction of the camera.

FIG. 9 shows another time flow pattern that may be used to reverse the scanning direction, while preserving the original water flow. The slicing scheme depicted in FIG. 9 uses a slice whose slope is $tg(\theta)=2tg(\alpha)$ where $\theta$ is the slope of the slice and $\alpha$ is the slope of the visibility region both relative to the u axis. The generated mosaic image has the width w as the original image. Sliding this slice in the positive time direction (down) moves the mosaic image to the left, in the opposite direction to the original scanning order. The width of the generated images remains unchanged. Time flow in the positive time direction (down) moves the generated images to the left, reversing the original panning direction. However, each local region exhibits the same temporal evolution as it did in the original sequence. Local point $u_a$, for example, will first appear as it was in time $t_k$, and will evolve in time until it disappears at time $t_1$.

7.6. Linear Slices of the Space-Time Volume

Figure 10:
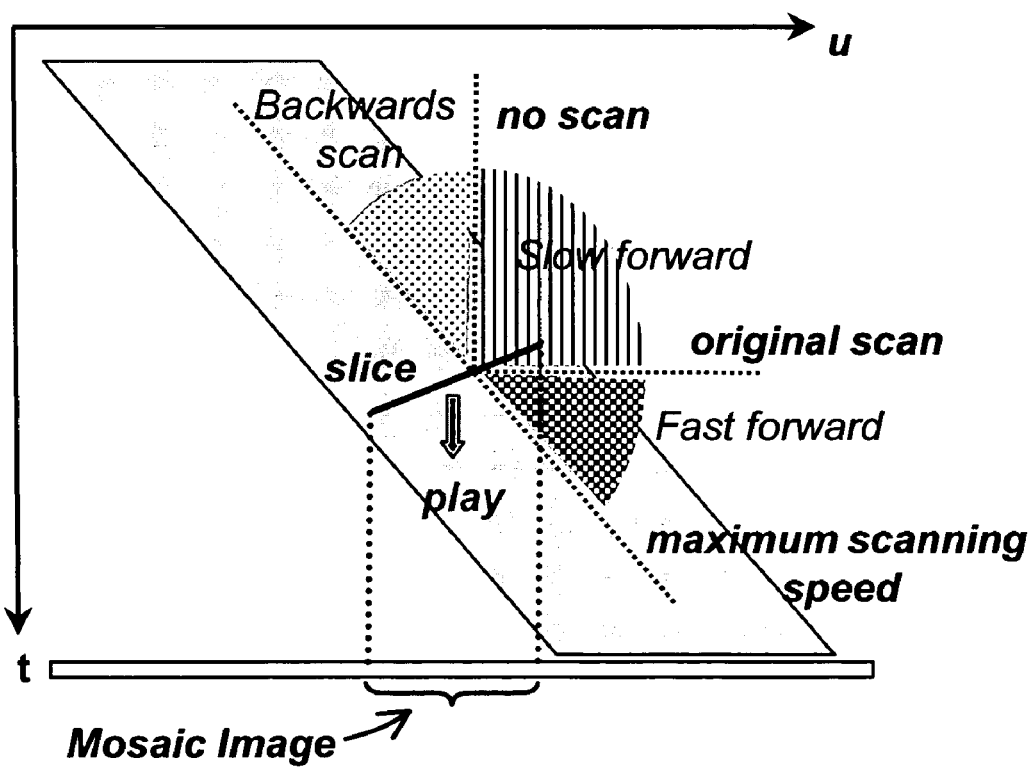
FIG. 10 is a schematic representation showing effects of various linear slices on the space-time volume of an input sequence from a rotating camera.

FIG. 10 shows schematically the different types of time manipulations that can be obtained with linear slicing schemes. The slices in FIG. 10 are always played "down" in the direction of positive time at the original speed to preserve the original relative time and can vary both in their angle relative to the u axis and in their length.

While in this example the slice always translates in a constant speed in the positive time, various slice angles will have different effects on the resulting video. Thus, different slice angles result in different scanning speeds of the scene. For example, maximum scanning speed is achieved with the panoramic slices. Indeed, with panoramic slices the resulting movie is very short, as all regions are played simultaneously. (The scanning speed should not be confused with the dynamics of each objects, which always preserve the original speed and direction).

The slicing scheme can create different results with different cropping of the slice, controlling the field of view of the mosaic images. This can be useful, for example, when changing the scanning speed of the scene while preserving the original field of view.

In addition to the slicing approaches so far described where the mosaicing is done from slices translating along the time axis, time manipulations effects can be obtained by changing the angle of the slice during the translation. This can make some regions move faster or slower compared to other regions. For example, if we rotate the slice about a line in the 3D space-time volume, this line will remain stationary in the generated sequence, while other regions will be moving with speed relative to the distance from the stationary line. Such slicing can be used also with a stationary camera, and it can show various effects: The top of the resulting image will move faster than its bottom, or the left side will move faster than the right side, etc.

8. Non-Linear Slices

8.1. The "Doppler" effect

For simplicity we present the distortion analysis in the one-dimensional case, when the objects are moving along the u-t plane. In our experiments, we found that the distortions caused by the motion component perpendicular to this plane were less noticeable. For example, in the panoramic dynamics most distortions are due to image features moving in the direction of the scanning camera.

We examine the area in the space time volume where a time slice intersects a path traced by a moving object. Let $\alpha_c$ be the angle between the time slice and the t axis. When $\alpha_c = 90°$ there is no distortion as the entire area is taken from the same frame.

Let $\alpha_0$ be the angle between the path of the object and the t axis. When $\alpha_o = 0$ the object is stationary and again there is no distortion. It can be shown that the distortion is proportional to $$\left| \frac{tg(\alpha_c)}{tg(\alpha_c) - tg(\alpha o)} \right|.$$

In the particular case of panoramic dynamosaicing, the effect of linear slicing of the space time volume on moving objects can be understood by imagining a virtual "slit" camera which scans the scene, as in done in [24]. Similar to the general case, the width $w^{new}$ in the panoramic movie of an object with original width $w^{original}$ will be:

$$w^{new} = \left| \frac{v_c}{v_c - v_o} \right| w^{original}$$

where $v_c$ and $v_o$ are the velocities of the slit and the object correspondingly. Note that for panoramic dynamosaicing, the velocity of the slit is a combination of the velocities of the camera and the slice.

Objects moving opposite to the scanning direction have negative velocity ($v_o < 0$). This implies that such objects will shrink, while objects moving in the camera direction will expand, as long as they move more slowly than the camera. The chronological order of very fast objects may be reversed. Notice also that when the camera motion $v_c$ is large, $w^{new}$ approaches $w^{original}$ which means that when the camera is moving fast enough relative to the objects in the scene, these distortions become insignificant.

The shrinking and expansion effects just described have some interesting resemblance to the well known Doppler Effect. The frequencies of object motions getting closer become higher, while the frequencies of object motions moving far away become lower.

8.2. Non-Linear Slices

Slicing with straight lines, as discussed above, can produce impressive panoramic videos. Sometimes, however, moving objects in the scene are distorted in a way that is too disturbing. This includes fast moving objects, or rigid objects that lose their rigidity in the resulting movies.

It is indeed possible to minimize the distortions at selected areas (e.g. at points of interest), while increasing the potential distortions in other regions. Such varying distortion can be implemented using slices that are not straight, as demonstrated in FIG. 11. The slope of the slice is smaller in regions where the distortion should be minimized, and larger in regions were the distortion is less noticeable or less important (such as the static regions, where no distortion occurs). In the extreme case, a few moving regions can have a "zero" slope, meaning that the objects in that regions will be displayed exactly as they were displayed in the original video.

9. Parallax Effects

So far we have discussed the effects of time flow manipulation on a scene with moving objects. We will now consider a different type of image motion: motion parallax. While general video sequences may have both motion parallax and moving objects, for the sake of clarity we discuss the parallax issue separately from moving objects. It will be assumed that the input video sequences are captured by a camera translating sideways.

It has been found by the inventors that when a scene is scanned by a translating camera, the time flow pattern shown in FIG. 8a, which was used to generate dynamic panoramic mosaics, may also be used to produce a stereo parallax effect. For example, FIGS. 12a and 12b shows two "stereo" views generated from a space time volume captured by a translating camera. The time fronts corresponding to these two views are similar to those marked as "initial" and "final" in FIG. 8a, except that they are planar in order to avoid geometric distortions. The initial time front consists of the right sides of all input frames, and therefore each point in the resulting image appears to be viewed from a viewpoint to its left. Similarly, each point in the image corresponding to the final time front appears to be viewed from the right. Sweeping the time front from initial to final results in a sequence where the bottles appear to rotate on a turntable in front of a static camera.

To understand the meaning of these different time fronts, assume two pictures from a translating camera viewing a house. In one picture the house is in the right side of the input picture and in the other input picture the house is on the left side. When the house is on the right side of the picture, we see the left side of the house. When the house is on the left side of the picture, we see the right side of the house. For this reason, FIG. 12a which is built from the right parts of the input images views the objects from the left, while FIG. 12b which is built from the left parts of the input images views the objects from the right. Therefore, time fronts from various image locations correspond to different viewing directions of the scene. A detailed geometric interpretation of this case, as well as the effects of different camera trajectories, can be found in [30].

Figure 13A:
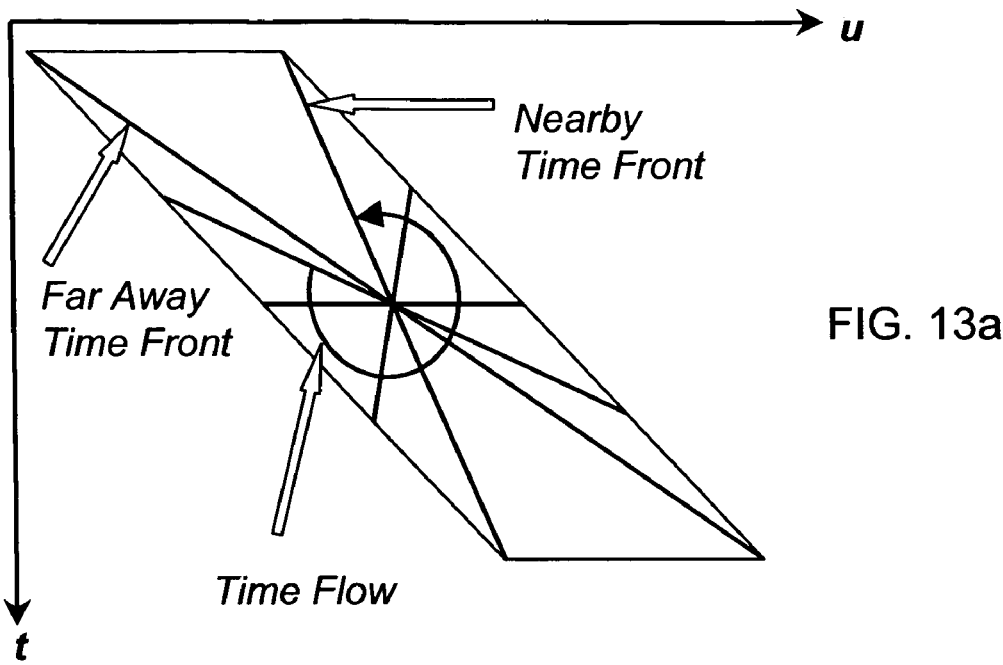
FIG. 13a shows the progression of time flow with a rotating time front.
Figure 13B:
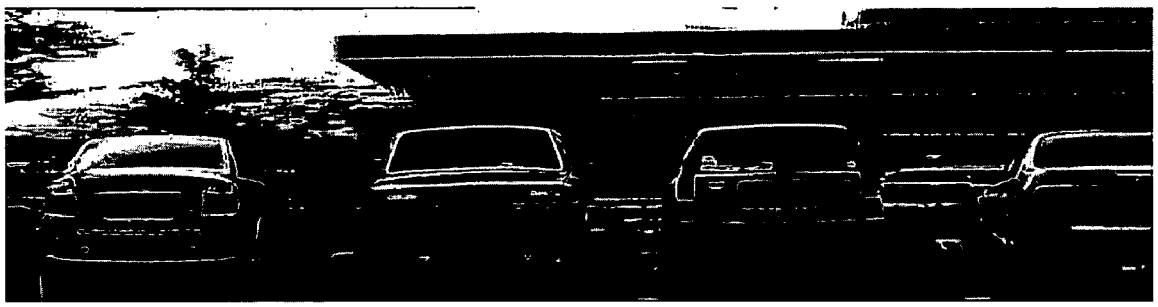
Figure 13C:
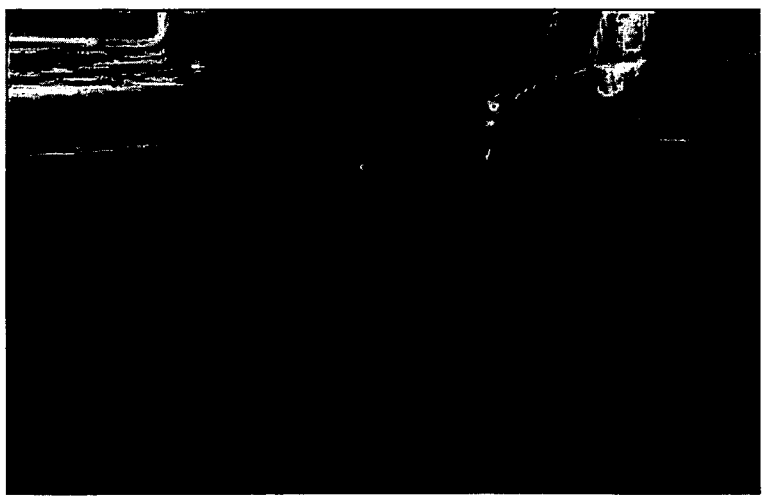

Another interesting case, shown in FIGS. 13a to 13c, is the case of the XSlits camera [11], whose contents are fully incorporated herein by reference. The forward parallax effect is created by rotating the time front. The scene was scanned by a translating video camera. FIG. 13a shows the progression of time flow with a rotating time front. In this case the time front does not sweep forward in time, as was the case with all of the examples discussed so far; instead, the time front rotates inside the space-time volume. The image shown in FIG. 13b was created by the "Far Away" time front, and the resulting image seems to be taken from a camera further away from the scene. The image shown in FIG. 13c was created by the "Nearby" time front, and the resulting image seems to be taken by a camera closer to the scene than the one used to capture the original sequence. It will be noted that the two sides of the central cars are visible in FIG. 13c but not in FIG. 13b. As demonstrated in this figure and explained in [11], the rotation of the time front results in an apparent forward or backward motion of the generated views. It is believed that this special kind of video warping, which can transform a sideways moving video into a forward moving video simply by defining an appropriate time front motion, is an important testament to the power and elegance of the evolving time fronts paradigm.

9. Video Splicing

Figure 14A:
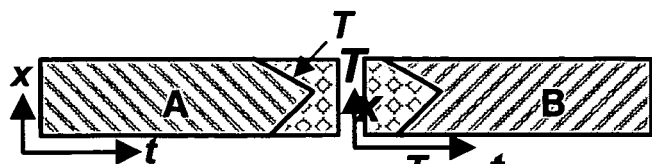
FIGS. 14a to 14d show various stages in the time splicing of video clips.
Figure 14B:
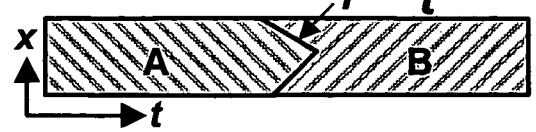

Kwatra et al. [10] describe a method for splicing together video clips using graph cuts. Specifically, they search for an optimal spatio-temporal surface T that will make the seam between the two video clips as invisible as possible. This splicing scheme is illustrated in FIG. 14a representing two time-lines of video clips to be spliced together. An optimal space-time slice T is selected by Kwatra et al. [10] for a smooth spliced video shown in FIG. 14b. The same space-time slice T is used for both clips A and B and the resulting spliced video. Such an approach can be summarized as follows: Given two video clips A(x,y,t) and B(x,y,t) (A and B can be the same video clip), and given a time shift d between them, a new video clip C(x,y,t) is generated by splicing A and B together using the following rule:

$$C(x, y, t) = \begin{cases} A(x, y, t) & \text{if } t < T(x, y) \\ B(x, y, t-d) & \text{if } t > T(x, y) \end{cases},$$

where the space-time surface T(x, y) corresponds to a graph cut that minimizes the cost of transition between A and B, in order to make the clip C seamless. In many cases, however, seamless splicing is impossible, since no single spatio-temporal cut T(x, y) achieves a sufficiently small transition cost.

Figure 14C:
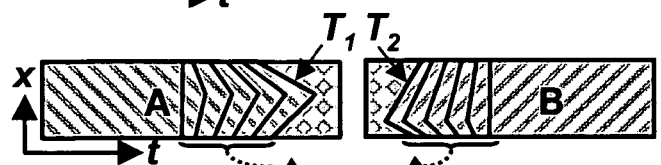
Figure 14D:
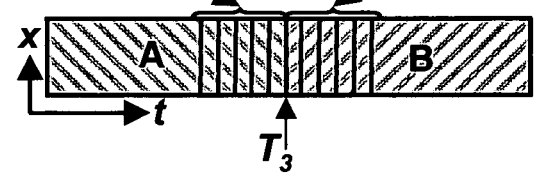

FIGS. 14c and 14d show the use of evolving time fronts according to the invention to offer a more flexible solution by allowing the transition to occur between two different spatio-temporal surfaces, $T_1$ in A and $T_2$ in B. A spliced video clip C may then be generated by warping both $T_1$ and $T_2$ to a common time front $T_3$ in the spliced clip C. In FIG. 14c a space-time slice $T_1$ is selected in Clip A, and a possibly different space time $T_2$ is selected in Clip B. In FIG. 14d the clips are spliced together by mapping gradually evolving time fronts in clips A and B to a common space-time slice $T_3$ in the spliced video.

The use of evolving time fronts for video splicing should be most significant when different regions of the scene have different temporal behavior (e.g., different periodicity). In such cases, the video can be better synchronized by slowing down or accelerating different parts of the scene.

10. EXAMPLES

Figure 15A:
Figure 15B:

FIGS. 15a, 15b, 16a and 16b show examples of panoramic dynamosaics for different types of scenes. In FIG. 15a, the street performer was moving very quickly forward and backwards. Therefore, the linear slicing scheme of FIG. 8f resulted in distorted images (left). With the non-linear slicing shown in FIG. 11, the distortions of the performer were reduced with no significant influence on its surrounding.

The street performer constitutes a fast-moving object within a selected portion of the source image shown in FIG. 15a. If desired more than one selected portion of the source image may contain a respective fast-moving object. In this example, if the selected portions are too narrow the street performer's unicycle is broken into parts. The selected portion should therefore be large enough to include the entire object.

Figure 16A:
Figure 16A:

FIG. 16a shows a frame of a dynamic panorama of a tree moving in the wind. Some 300 frames were obtained by scanning the tree from the bottom up. FIG. 16b shows a single frame from the resulting dynamosaic movie created using simple linear slices

11. CONCLUSION

Given an input video sequence, new video sequences with a variety of interesting, and sometimes even surprising, effects may be generated by sweeping various evolving time fronts through its space-time volume. The space-time volume is "aligned" or "stabilized" with respect to the camera motion, and this alignment is important for all cases involving a moving camera.

While the generation of new images by slicing through the space time volume is not new, the invention presents a new methodology to design the time flow for a specific desired effect. The time flow, which is the progression of time fronts through the space-time volume, can be manipulated to generate effects which include: (i) Shifting in time or changing the speed of selected spatial regions. (ii) Simultaneous spatial and temporal manipulations. (iii) Creating patterns in dynamic textures. (iv) Generation of dynamic panoramas. (v) Producing parallax in new directional views or even in forward motion.

While (i), (iv), and (v) were introduced before as unrelated cases, they are shown by the invention to be just special cases of the more general and powerful evolving time fronts framework.

The description has concentrated on the introduction of the evolving time fronts framework and some of the effects it can generate. It is understood that many variations to the basic method are possible. For example, some variations include: (i) Tracking of moving objects. This tracking is necessary to avoid the distortion of moving objects when they are reconstructed from their appearances at different times. In this case care should be taken to always select a moving object from a single frame, or a small number of adjacent frames. (ii) Interpolation. In the presence of image motion, more sophisticated interpolation should take into account this motion to prevent blurring and ghosting.

It has thus been shown in accordance with the present invention that when a scene is scanned by a video camera, the chronological time is not essential to obtain a dynamic description of the scene. Relative time, describing the individual dynamic properties of each object or region in the scene, is more important that the chronological time.

The invention exploits this observation to manipulate sequences taken from a video camera in ways that have previously been impossible. In particular, we have demonstrated the use of this concept to create dynamic panoramas, and to invert the scanning direction of the camera, without effecting the local dynamic properties of the scene.

Besides their impressive appearance, dynamic panoramas can be used as a temporally compact representation of scenes, for the use of applications like video summary or video editing. The video summary effect is created when events that occurred at different times are displayed simultaneously, thereby reducing the length of the generated video.

The possible distortions of objects moving in the scanning direction can be handled with traditional motion segmentation methods [25] and nonlinear slicing. First, independently moving objects will be segmented. Then, the rest of the scene, including dynamic textures and other temporal changes will be addressed with the proposed method.

Unlike dynamic textures [15] using statistical motion features to generate an infinite playing video, Dynamosaicing displays only dynamic feature that actually occur in the scene.

12. Hardware Implementation

Figure 17:
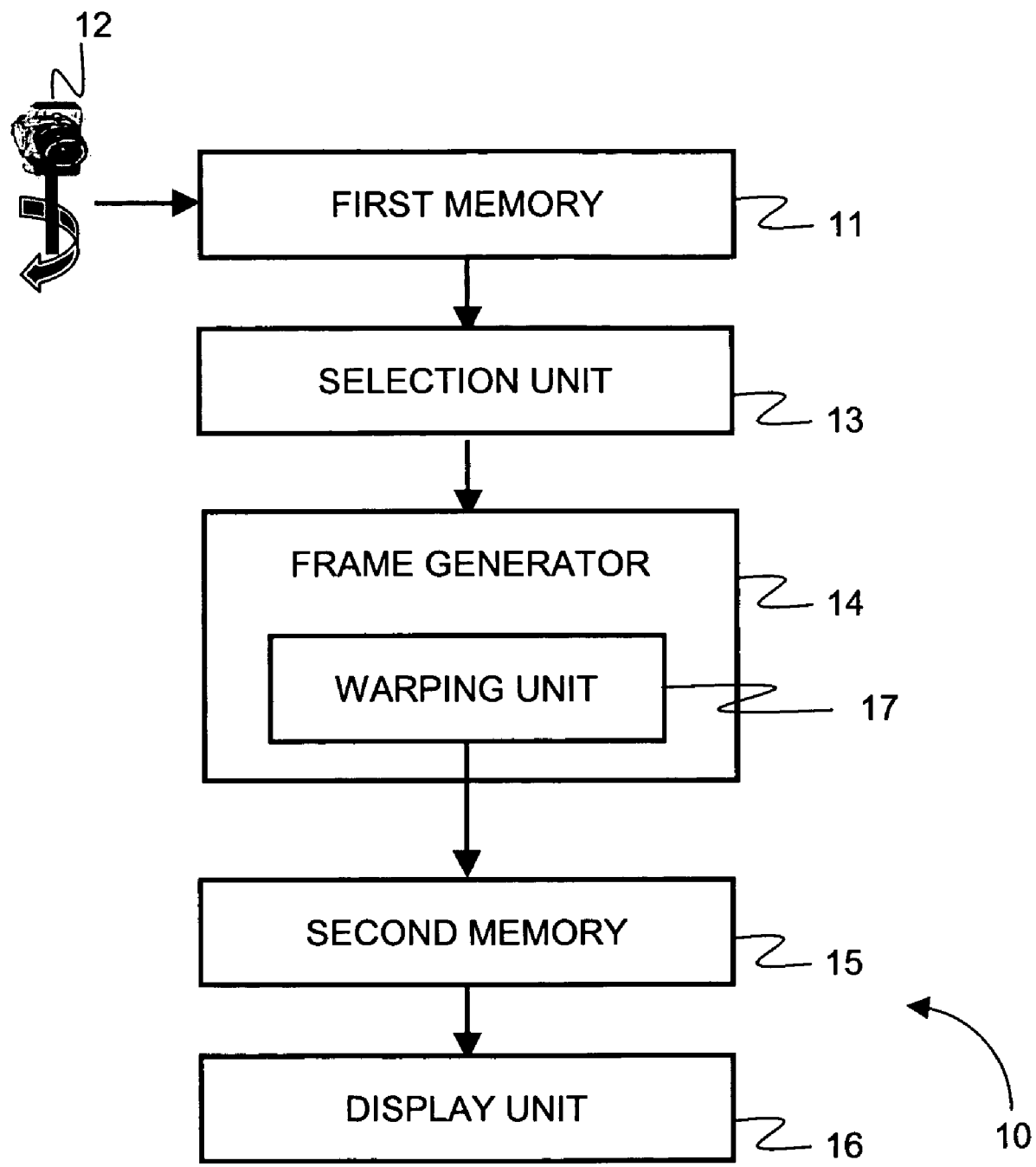
FIG. 17 is a block diagram showing the main functionality of a system according to the invention.

Referring now to FIG. 17, there is shown a block diagram of a system 10 according to the invention for transforming a first sequence of video frames of a first dynamic scene captured at regular time intervals to a second sequence of video frames depicting a second dynamic scene. The system includes a first memory 11 for storing the first sequence of video frames derived from a camera 12. A selection unit 13 is coupled to the first memory 11 for selecting spatially contiguous portions from at least three different frames of the first sequence for at least two successive frames of the second sequence. A frame generator 14 copies the spatially contiguous portions to a corresponding frame of the second sequence so as to maintain their spatial continuity in the first sequence. The frames of the second sequence are stored in a second memory 15 for subsequent processing or display by a display unit 16. The frame generator 14 may include a warping unit 17 for spatially warping at least two of said portions prior to copying to the second sequence.

The system 10 may in practice be realized by a suitably programmed computer having a graphics card or workstation and suitable peripherals, all as are well known in the art.

Figure 18:
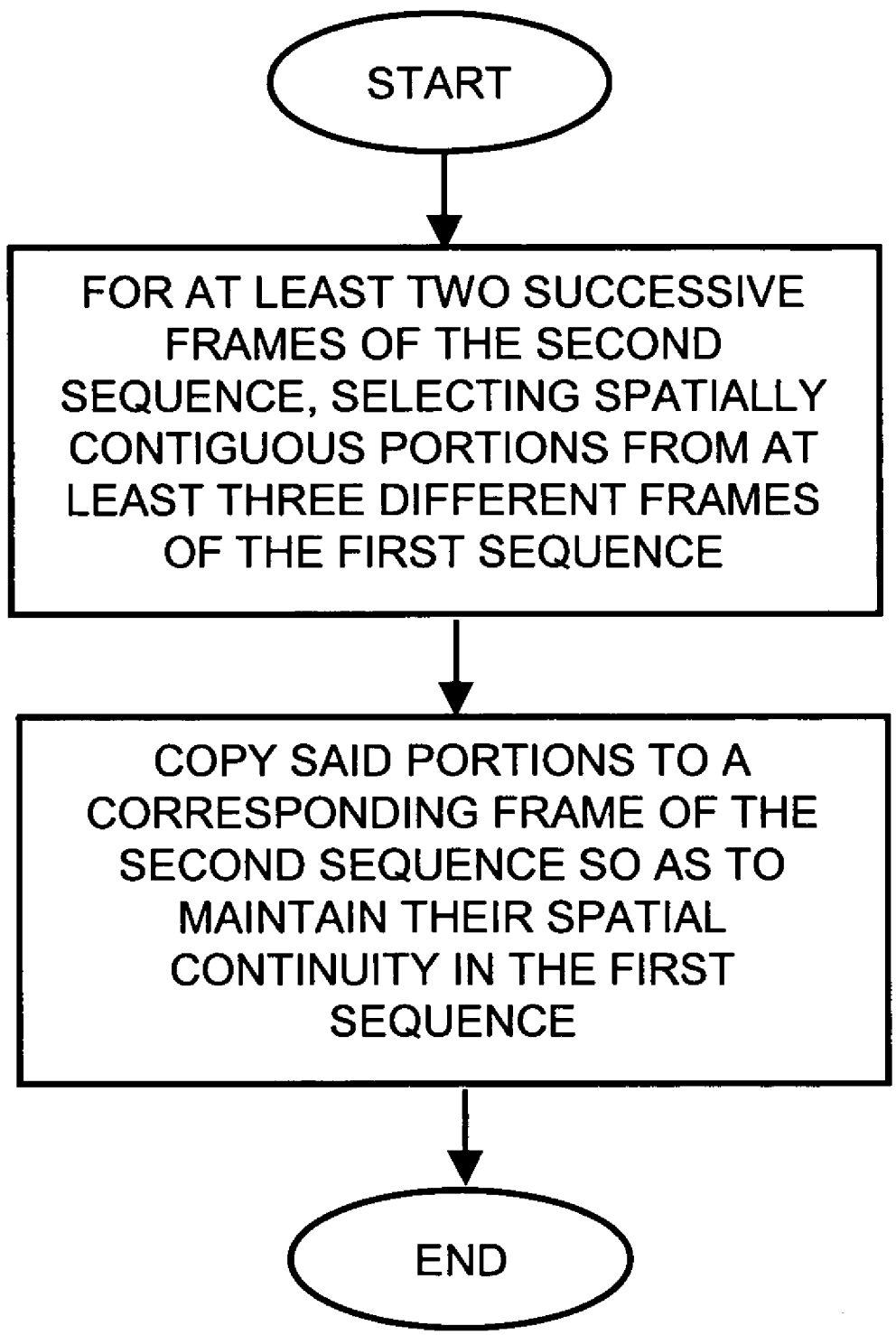
FIG. 18 is a flow diagram showing the principal operation carried in accordance with the invention.

For the sake of completeness, FIG. 18 is a flow diagram showing the principal operations carried out by the system 10 according to the invention.

13. Additional Technical Material: Moving Objects

The invention also provides a method to handle the mosaicing of a scene with moving objects. Such a method is helpful in all cases where mosaic images are generated by pasting together parts of the original images from a moving or a static camera. If moving, the camera can have a pure rotation, or a translation, or any other motion of change of camera parameters. The scene can be assumed as static or as dynamic. This method includes the following operations:

1. Find the moving objects. This can be done manually by an operator marking moving objects in each image in the sequence of input images, or interactively where the operator marks the moving object in at least one frame and the system completes the marking in other frames using well-known motion detection methods. Detection of moving objects can also be done automatically by known motion segmentation and tracking methods.
2. In order that a moving object will not be distorted by mosaicing relevant parts of this object are preferably included in one segment which is pasted into the mosaic image. This is done by amending the mosaicing method used: examining the image parts to be included in the mosaic as if the scene had no moving objects, and changing the regions in a way that, on one hand, will include most of the moving object in a single region and, on the other hand, will preserve the desired effects of the mosaicing, e.g. stereo mosaicing, dynamic panorama, etc.
3. Stitching together the image regions pasted in (2) into a mosaic image, whereby moving parts will not be distorted.

14. Appendix

14.1. Using Image Coordinate System

Figure 19A:
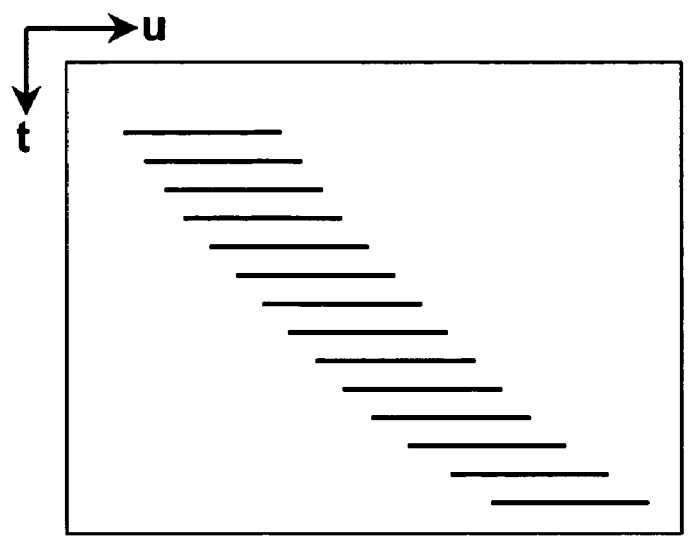
FIGS. 19a and 19b show alternative representations of the space-time volume that may be used according to the invention.
Figure 19B:
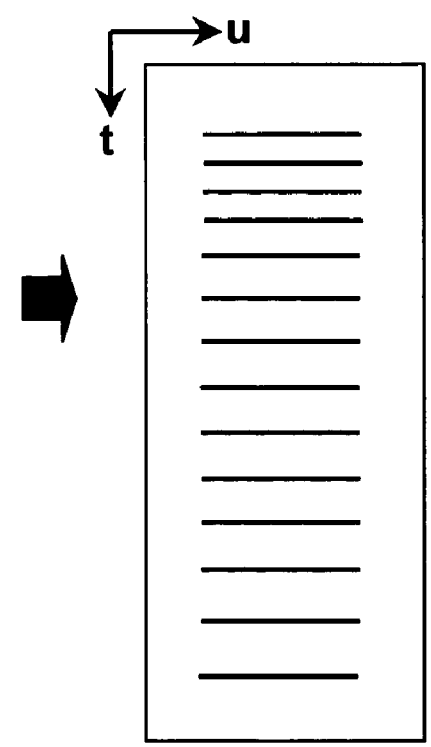

Sometimes it is more convenient to use an alternative representation of the space-time volume, described in FIG. 19a and 19b. In this representation, the world coordinates (u,v) are replaced with the image coordinates (x,y). Although the first representation is technically more correct, the later one might be easier to implement, especially when the velocity of the camera varies from frame to frame. In the image coordinate system, for example, dynamosaic panoramic movies corresponds to parallel vertical slices of the (x,y,u) space-time volume.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A computer-implemented method for transforming a first sequence of video frames of a first dynamic scene captured by a single stationary camera at regular time intervals to a second sequence of video frames depicting a second dynamic scene, the method comprising:
    (a) selecting from at least three different frames of the first sequence portions that are mutually spatially contiguous in said frames;
    (b) copying said portions to at least two successive frames of the second sequence, while maintaining their mutual spatial continuity and such that at least two of said portions are copied to the same frame or are copied to different frames in reverse order; and
    (c) storing in a computer-readable memory data representative of the at least two successive frames of the second sequence for subsequent processing or rendering.

2. The method according to claim 1, wherein the at least three different frames of the first sequence are temporally contiguous.

3. The method according to claim 1, including spatially warping at least two of said portions prior to copying to the second sequence.

4. The method according to claim 1, wherein the selected portions are spatially contiguous in the first dynamic scene.

5. The method according to claim 1, wherein at least one of the selected portions relates to a moving object.

6. A method according to claim 1 wherein two events that occurred simultaneously in the first video sequence are displayed at different times in the second video sequence.

7. A computer-implemented method for transforming a first sequence of video frames of a first dynamic scene captured at regular time intervals by a single camera to a second sequence of video frames depicting a second dynamic scene, the method comprising:
 (a) capturing at least two events having a first mutual temporal relationship in the first sequence; and
 (b) displaying said at least two events in the second sequence so as to define a second mutual temporal relationship that is different from the first mutual temporal relationship.

8. The method according to claim 7, when used to display events that occurred simultaneously in the first sequence at different times in the second sequence.

9. The method according to claim 7, when used to display events that occurred at different times in the first sequence simultaneously in the second sequence.

10. The method according to claim 7, comprising:
 (c) for at least one feature in the first dynamic scene sampling respective portions of the first sequence of video frames at a different temporal rate than surrounding portions of the first sequence of video frames; and
 (d) copying sampled portions of the first sequence of video frames to at least two frames of the second sequence.

11. The method according to claim 7, wherein the first dynamic scene is captured by a camera at a fixed location.

12. The method according to claim 11, wherein the camera is rotated relative to an axis at said fixed location.

13. The method according to claim 7, wherein the frames of the first sequence are temporally contiguous.

14. The method according to claim 7, including warping at least two of said sampled portions prior to copying to the frames in the second sequence.

15. The method according to claim 7, wherein the sampled portions are spatially contiguous in the first dynamic scene.

16. The method according to claim 7, including pre-aligning the first sequence of video frames so as to produce an aligned space-time volume by:
 (e) computing image motion parameters between frames in the first sequence;
 (f) warping the video frames in the first sequence so that stationary objects in the first dynamic scene will be stationary in the video.

17. The method according to claim 7, wherein at least one of the sampled portions relates to a moving object.

18. A system for transforming a first sequence of video frames of a first dynamic scene captured by a stationary camera at regular time intervals to a second sequence of video frames depicting a second dynamic scene, the system comprising:
 a selection unit coupled to the first memory for selecting from at least three different frames of the first sequence portions that are mutually spatially contiguous portions in said frames,
 a frame generator for copying said portions to at least two successive frames of the second sequence while maintaining their mutual spatial continuity and such that at least two of said portions are copied to the same frame or are copied to different frames in reverse order, and
 a second memory for storing frames of the second sequence.

19. The system according to claim 18, further including a display device coupled to the second memory for displaying the second dynamic scene.

20. The system according to claim 18, wherein the at least three different frames of the first sequence are temporally contiguous.

21. The system according to claim 18, wherein the frame generator includes a warping unit for warping at least two of said portions prior to copying to the second sequence.

22. The system according to claim 18, further including an alignment unit coupled to the first memory for pre-aligning the first sequence of video frames by:
 (g) computing image motion parameters between frames in the first sequence;
 (h) warping the video frames in the first sequence so that stationary objects in the first dynamic scene will be stationary in the video.

23. A non-transitory computer readable storage medium embodying a program of instructions to perform a method for transforming a first sequence of video frames of a first dynamic scene captured by a stationary camera at regular time intervals to a second sequence of video frames depicting a second dynamic scene, the method comprising: (a) selecting from at least three different frames of the first sequence portions that are mutually spatially contiguous in said frames; (b) copying said portions to at least two successive frames of the second sequence so as to maintain their mutual spatial continuity and such that at least two of said portions are copied to different frames in reverse order; and (c) Storing in a computer readable memory data representative of the at least two successive frames of the second sequence for subsequent processing or rendering.

24. A non-transitory computer readable storage medium embodying a computer readable program embodied therein for transforming a first sequence of video frames of a first dynamic scene captured by a stationary camera at regular time intervals to a second sequence of video frames depicting a second dynamic scene, the computer readable program comprising: computer readable program instructions for causing the computer to select from at least three different frames of the first sequence portions that are mutually contiguous in said frames; computer readable program instructions for causing the computer to copy said portions to at least two successive frames of the second sequence while maintaining their spatial continuity and such that at least two of said portions are copied to the same frame or are copied to different frames in reverse order; and computer readable program instructions for causing the computer to store in a computer readable memory data representative of the at least two successive frames of the second sequence for subsequent processing or rendering.

25. A non-transitory computer readable storage medium embodying a program of instructions to perform a method for transforming a first sequence of video frames of a first dynamic scene captured at regular time intervals by a single camera to a second sequence of video frames depicting a second dynamic scene, the method comprising: (a) capturing at least two events having a first mutual temporal relationship in the first sequence and (b) displaying said at least two events in the second sequence so as to define a second mutual temporal relationship that is different from the first mutual temporal relationship.

26. A non-transitory computer readable storage medium embodying a computer readable program embodied therein for transforming a first sequence of video frames of a first dynamic scene captured at regular time intervals by a single camera to a second sequence of video frames depicting a second dynamic scene, the computer readable program comprising: computer readable program instructions for causing the computer to capture at least two events having a first mutual temporal relationship in the first sequence; and (b) computer readable program instructions for causing the computer to display said at least two events in the second sequence so as to define a second mutual temporal relationship that is different from the first mutual temporal relationship.

27. The device according to claim 23, wherein the first sequence of video frames are frames that were captured while the camera was moving, and movement of the camera was compensated for by aligning all of the frames in the first sequence to global spatial coordinate system.

* * * * *